United States Patent [19]

Ulvr et al.

[11] Patent Number: 5,602,382

[45] Date of Patent: Feb. 11, 1997

[54] MAIL PIECE BAR CODE HAVING A DATA CONTENT IDENTIFIER

[75] Inventors: Joseph Ulvr, Carp; Adrian T. S. C. Kho, Kanata, both of Canada

[73] Assignee: Canada Post Corporation, Ontario, Canada

[21] Appl. No.: 331,955

[22] Filed: Oct. 31, 1994

[51] Int. Cl.⁶ .................................................. G06K 19/06
[52] U.S. Cl. .................... 235/494; 235/463; 235/462; 235/456; 235/375; 371/37.1
[58] Field of Search .................................... 235/494, 463, 235/462, 456, 375; 371/37.1, 38.1, 39.1, 40.1; 209/584, 900

[56] References Cited

U.S. PATENT DOCUMENTS

| | | | |
|---|---|---|---|
| 3,991,300 | 11/1976 | Chadima, Jr. | 235/61.12 |
| 4,013,997 | 3/1977 | Treadwell, III | 371/37.1 |
| 4,742,521 | 5/1988 | Nishida | 371/84 |
| 4,852,099 | 7/1989 | Ozaki | 371/37 |
| 4,864,112 | 9/1989 | Imai et al. | 235/463 |
| 4,874,936 | 10/1989 | Chandler et al. | 235/494 |
| 4,896,029 | 1/1990 | Chandler et al. | 235/494 |
| 4,972,475 | 11/1990 | Sant'Anselmo | 380/54 |
| 4,998,010 | 3/1991 | Chandler et al. | 235/494 |
| 5,053,609 | 10/1991 | Priddy et al. | 235/436 |
| 5,068,858 | 11/1991 | Blaum et al. | 371/41 |
| 5,070,504 | 12/1991 | Bossen et al. | 371/54 |
| 5,099,484 | 3/1992 | Smelser | 371/38.1 |
| 5,107,503 | 4/1992 | Riggle et al. | 371/37.1 |

(List continued on next page.)

FOREIGN PATENT DOCUMENTS

| | | |
|---|---|---|
| 984971 | 3/1976 | Canada. |
| 998474 | 10/1976 | Canada. |
| 1003966 | 1/1977 | Canada. |
| 1004767 | 2/1977 | Canada. |
| 1070837 | 1/1980 | Canada. |
| 1120884 | 3/1982 | Canada. |
| 1145847 | 5/1983 | Canada. |
| 1152648 | 8/1983 | Canada. |
| 1173962 | 9/1984 | Canada. |
| 1202929 | 4/1986 | Canada. |
| 1241443 | 8/1988 | Canada. |
| 1264341 | 1/1990 | Canada. |
| 2019956 | 12/1990 | Canada. |
| 2006898 | 6/1991 | Canada. |

(List continued on next page.)

OTHER PUBLICATIONS

M. Mansour, "Multi–Tiered Condensed Bar Code", vol. 26, No. 2, Jul. 1983 (IBM Technical Disclosure Bulletin).
R. E. Blahut, K. Jones, J. A. Fairless, "A Damage Resistant Bar Code for the Royal Mail", pp. 49–54; IBM 156.

*Primary Examiner*—Donald T. Hajec
*Assistant Examiner*—Michael G. Lee
*Attorney, Agent, or Firm*—Wenderoth, Lind & Ponack

[57] ABSTRACT

A bar code for mail pieces uses bars each of which has four possible states. Two different bars indicate the start of the code and the same two bars in the same order indicate the end of the code. A data content identifier follows the start bars and this indicates the structure and length of the following data field so that when the code is read it will be recognized and read properly. The use of the data content identifier allows the code to be used for different customer and Post Office applied applications in which the code structure, length and content varies. The data field may contain a postal code with or without an address locator, a machine ID, customer information and service information. The code may include a country code field for mail pieces that are being mailed to a different country. The code may also include a field indicating whether the codeword is complete or whether it has to be concatenated with a preceding or subsequent codeword. Error protection in all cases is provided by a Reed-Solomon parity field following the data field. For customer applied codes this parity field may be made shorter than for Post Office applied codes because the potential for error in printing the code by the customer is less in view of the fact that he has more control over the paper quality, colour, extraneous markings, etc.

27 Claims, 5 Drawing Sheets

U.S. PATENT DOCUMENTS

| | | | |
|---|---|---|---|
| 5,124,536 | 6/1992 | Priddy et al. | 235/432 |
| 5,126,542 | 6/1992 | Priddy et al. | 235/456 |
| 5,153,929 | 10/1992 | Itagaki | 382/65 |
| 5,157,669 | 10/1992 | Yu et al. | 371/37.7 |
| 5,161,163 | 11/1992 | Bossen et al. | 371/54 |
| 5,168,509 | 12/1992 | Nakamura et al. | 375/39 |
| 5,206,490 | 4/1993 | Petigrew et al. | 235/462 |
| 5,226,932 | 7/1993 | Prasad | 55/16 |
| 5,235,172 | 8/1993 | Oehlmann | 235/494 |
| 5,280,488 | 1/1994 | Glover et al. | 371/37.1 |
| 5,288,976 | 2/1994 | Citron et al. | 235/375 |
| 5,298,731 | 3/1994 | Ett | 235/494 |
| 5,304,786 | 4/1994 | Pavlidis et al. | 235/462 |
| 5,324,927 | 6/1994 | Williams | 235/494 |
| 5,420,403 | 5/1995 | Allum et al. | 235/375 |
| 5,475,716 | 12/1995 | Huang | 371/37.1 X |
| 5,479,515 | 12/1995 | Longacre, Jr. | 235/463 X |

FOREIGN PATENT DOCUMENTS

| | | |
|---|---|---|
| 2020475 | 6/1991 | Canada . |
| 2022269 | 7/1991 | Canada . |
| 1291247 | 10/1991 | Canada . |
| 1293806 | 11/1991 | Canada . |
| 1295744 | 2/1992 | Canada . |
| 1305257 | 7/1992 | Canada . |
| 1306807 | 8/1992 | Canada . |
| 1311842 | 12/1992 | Canada . |
| 2063103 | 9/1993 | Canada . |
| 2095508 | 11/1993 | Canada . |
| 2140948 | 12/1984 | United Kingdom . |

MAIL PIECE BAR CODE HAVING A DATA CONTENT IDENTIFIER

BACKGROUND OF THE INVENTION

This invention relates to bar codes used in the processing of mail pieces.

In many countries a postal code is used to facilitate automation in sorting. In Canada, the postal code contains three alphabetic characters (letters) interleaved with three numeric characters (numbers) while in the U.S.A. the zip code consists of five numbers. If a customer has applied the postal code to an envelope this is converted by an optical character reader (O.C.R.) and computer in the Post Office to a bar code which is then printed on the envelope. If the customer has not applied the postal code, this will be generated in the Post Office and the bar code will be printed on the envelope as before.

It is also becoming more usual for the large corporate customer to apply the postal code in bar code format. A bar code is used because it is easier to read automatically than alphanumeric characters.

The British Post Office (BPO) has developed a 4 state bar code. The four possible states are one which comprises only a tracker element, one which comprises a tracker element and an ascender element, one which comprises a tracker element and a descender element and one which comprises a tracker element, an ascender element and a descender element. These elements will be described in detail hereinbelow.

The BPO code uses four bars to represent each alphanumeric character but for error protection each character must have two ascenders and two descenders which limits the number of possible combinations to 36. Error detection is dealt with by including a check sum. The BPO code is intended to be printed by customers (mailers) to encode sortation information.

The BPO code uses a single bar to indicate the start of the code and a different single bar to indicate the end of the code. The start/stop bars in the BPO code can easily be confused and can result in decoding of an upside down bar code.

A paper entitled "A Damage Resistant Bar Code for the Royal Mail" by Blahut et al, 1992 discusses an improvement of the BPO bar code which essentially makes the BPO code more robust by adding Reed-Solomon error correction to handle missing bars (erasures) and bar print errors. The encoding is based on codewords of two bars each—a left and right codeword—and the interleaving of the codewords to form a bar code. Blahut has also identified some decoding logic to recover from missing or incorrect bars and overcome the weakness of the start/stop pattern with decoding logic. The Blahut Code is intended to be printed by the Post Office as an internal code and only postal sortation data is encoded.

It is an object of the present invention to improve on the BPO and Blahut codes by offering a robust code which is sufficiently flexible that it may be applied by the Post Office or the customer and which can be used not only for the postal code but for route sequencing, track and tracing, revenue accounting and other customer information as well as customer service information such as return mail management, automated data entry of customer information and the like.

SUMMARY OF THE INVENTION

According to a broad aspect of the invention, a mail piece bears a bar codeword containing information for the processing of the mail piece, the bar codeword having a plurality of parallel bars each of which has a state selected from a plurality of possible states. The bar codeword comprises a start field followed by a data content identifier (DCI) field specifying the structure of the codeword followed by at least one data field, followed by a Reed-Solomon parity field, followed by a stop field.

In one embodiment of the invention, as in Blahut, bars which have four possible states are used but the invention is not limited to the use of a four state code.

The data field may contain different types of information depending on the application. For example, it may contain a postal code in the ANANAN format where A is an alphabetical character and N is a numerical character. The A's are each represented by three bars and the N's are each represented by two bars.

The use of the start and stop bars provides an indication of correct orientation and direction of reading in a single efficient manner.

Not only postal (sortation and sequencing) data can be encoded but also customer data to support the creation of value added products and services selectable by the customer at the time of printing the mail pieces.

The new coding is space efficient because in a preferred embodiment it encodes characters in 3 bars with the numerics in the CPC postal code using only 2 bars each.

The code is highly damage resistant and provides varying levels of error correction appropriate to the application. For example, more error correction is provided in the internal applied codes than the customer applied codes.

The invention also enables in a specific embodiment the concatenation of multiple bar codes.

DESCRIPTION OF THE PREFERRED EMBODIMENTS

Referring to FIG. 1, the basic elements of the printed four state code are four vertical bars which differ in length and/or starting point with respect to the horizontal.

More particularly, there is a full height bar H which is the longest of the four bars and extends between lower and upper horizontal references $R_1$ and $R_2$, respectively. The bar immediately to the right of bar H is a bar D which is greater than half of the height of bar H and extends from above the mid-point of bar H down to the level of reference $R_1$. Immediately to the right of bar D is a bar A which has the same height as bar D but extends from below the mid-point of bar H up to the level of reference $R_2$. The final element is a bar T which is centred about the mid-point of bar H and which has a height represented by the overlap of bars A and D.

Figure 1A:
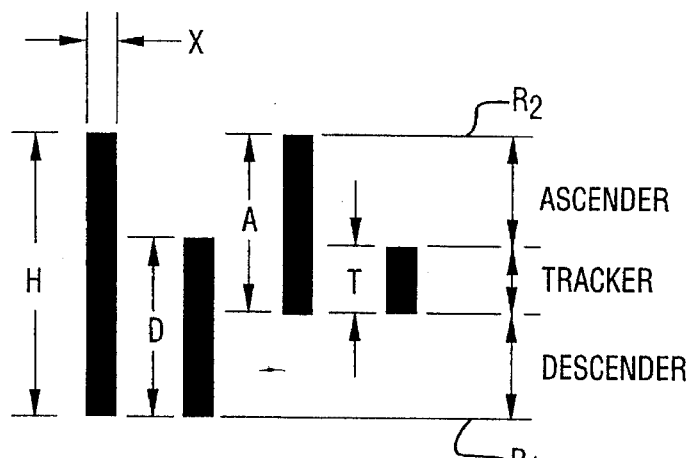
FIG. 1a illustrates the basic elements of the four state code used in a preferred embodiment of the invention.

Another way of defining bars H, D, A and T is in terms of the three basic elements, Tracker, Ascender and Descender shown in FIG. 1a. The Tracker element is a short element centred exactly between the lower and upper references $R_1$ and $R_2$. The Ascender and Descender elements are identical in length, the Ascender extending upwardly from the upper limit of the Tracker to reference $R_2$ and the Descender extending downwardly from the lower limit of the Tracker to reference $R_1$.

The Tracker is present in all of the four bars. In the T bar the Tracker is the only element, the D bar consists of Tracker and Descender, the A bar consists of Tracker and Ascender and the H bar consists of the Tracker, Ascender and Descender. The four possible bars and their assigned numerical values can be summarized as follows:

| BAR | ELEMENTS | VALUE |
| --- | --- | --- |
| T | Tracker | 3 |
| D | Tracker and Descender | 2 |
| A | Tracker and Ascender | 1 |
| H | Tracker, Ascender and Descender | 0 |

Figure 1B:
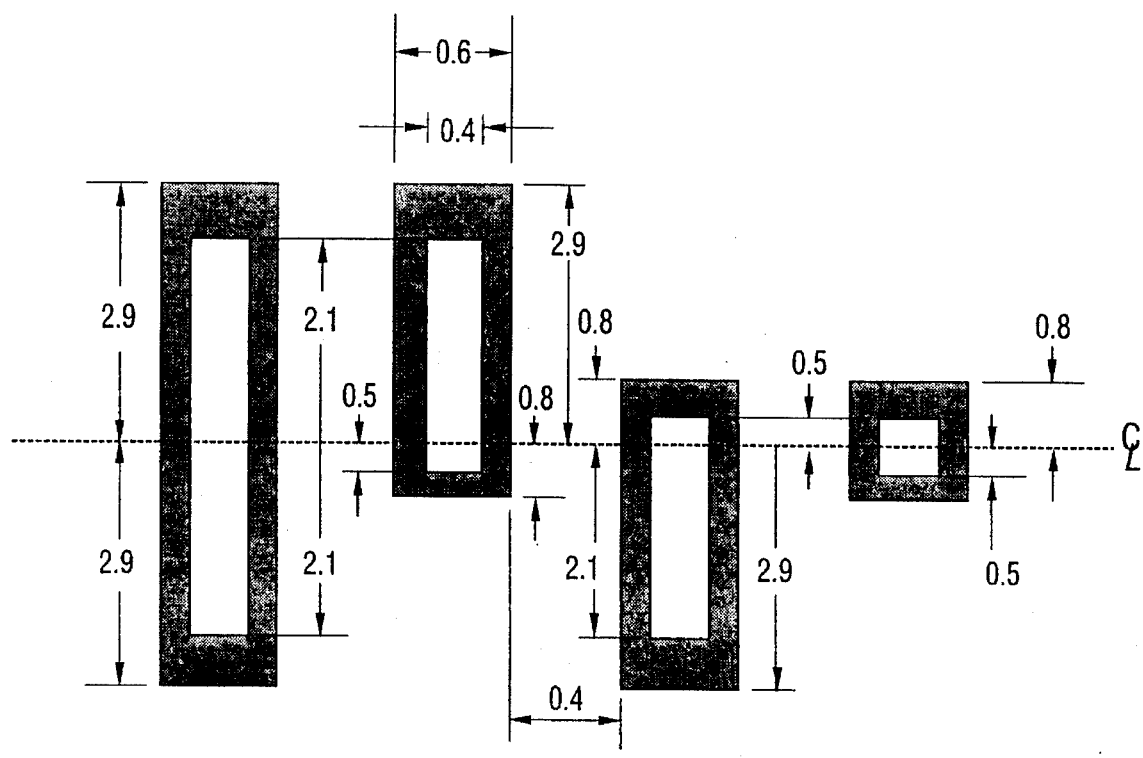
FIG. 1b illustrates the minimum and maximum dimensions of the bars used in the four state code.

The maximum and minimum permissible dimensions of elements A, D, H, T and bar width X are indicated in FIG. 1b where the maximum bar outlines are the shaded portions, and are summarized below:

| Element | Minimum | | Maximum | |
| --- | --- | --- | --- | --- |
| | mm | in. | mm | in. |
| T | 1.0 | 0.04 | 1.6 | 0.06 |
| A | 2.6 | 0.10 | 3.7 | 0.145 |
| D | 2.6 | 0.10 | 3.7 | 0.145 |
| H | 4.2 | 0.165 | 5.8 | 0.23 |
| X (bar width) | 0.4 | 0.015 | 0.6 | 0.025 |
| bar gap | 0.4 | 0.015 | | |

Note: The minimum gap between bars takes priority over all other dimensions.

Figure 2A:
FIGS. 2a to 2d illustrate how the code pattern or the individual bars within the code may be skewed.
Figure 2C:
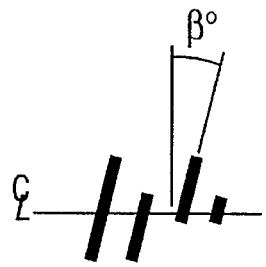
Figure 2D:
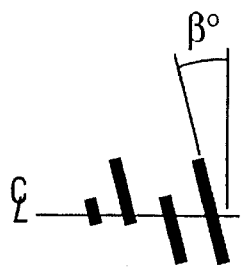
Figure 2B:
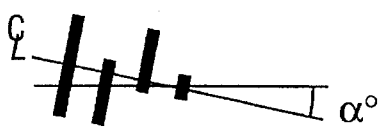

The bar density should be around 20–24 bars per 25.4 mm. FIG. 2 illustrates two types of skew that can occur when printing bar codes. FIGS. 2a and 2b illustrate code skew $\alpha$ in which the entire code pattern is skewed with respect to the bottom edge of the mail piece and FIGS. 2c and 2d illustrate bar skew $\beta$ in which individual bars are skewed with respect to the centreline of the code pattern.

For code skew the acceptable limit is less than ±5° from the horizontal and for bar skew the limit is less than ±5° from the vertical. It is possible for both types of skew to occur on a single item and in that case the total skew $|\alpha|+|\beta|$ should be less than 5°.

Canada Post Corporation (CPC) proposes using the basic four state bar code in different applications. The term PostBar has been coined by CPC to refer to the basic four state bar code and the letters xyz appear after the designation PostBar where "x" is "D" for domestic (Canada) applications
"G" for global (international) applications
"C" for CPC internal applications and
"S" for service applications.

"yz" specifies the number of characters in the bar code.

The PostBar applications are as follows:

| Domestic | Global | Service | Internal |
| --- | --- | --- | --- |
| PostBar.D07 | PostBar.G12 | PostBar.S06 | PostBar.C10 |
| PostBar.D12 | PostBar.G22 | PostBar.S11 | |
| PostBar.D22 | | PostBar.S21 | |

Figure 3:
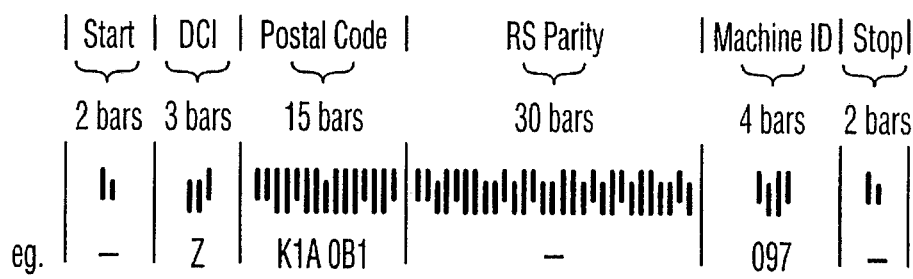
FIG. 3 illustrates a typical bar code employing the invention.

Let us consider in detail PostBar.C10 to illustrate how the four state code is applied. The format of this code is illustrated in FIG. 3. This may be summarized as follows:

| DATA FIELD | BARS | DATA CHARACTERS |
| --- | --- | --- |
| Start/synchronization | 2 | |
| Data Content Identifier (DCI) | 3 | Z |
| Postal code (FSA LDU) | 15 | ANANAN |
| RS Parity Check | 30 | |
| Machine ID | 4 | BBBB |
| Stop/synchronization | 2 | |
| Total | 56 | |

The data characters are denoted A, N, Z and B. A is an alphabetic character and is denoted by 3 bars, N is a numeric character and is denoted by 2 bars, Z is an alphanumeric (i.e., either alphabetic or numeric) character and is denoted by 3 bars and B is 1 bar.

Table 1 shows the encoding for the "A" and "N" characters and Table 2 shows the encoding for the "Z" characters.

TABLE 1

| 'A' CHARACTERS | | | 'N' CHARACTERS | | |
| --- | --- | --- | --- | --- | --- |
| Letter | Bars | | Number | Bars | |
| A | ..┼ \|·\|·· | HHD | 0 | ···┼ \|··· | HH |
| B | ··┼ \|·\|·· | HAH | 1 | ···┼ \|··· | HA |
| C | ··┼ \|·\|·· | HAA | 2 | ···┼ \|··· | HD |
| D | ··┼ \|·\|·· | HAD | 3 | ···┴ \|··· | AH |
| E | ··┼ \|·\|·· | HDH | 4 | ···┴ \|··· | AA |
| F | ··┼ \|·\|·· | HDA | 5 | ···┴ \|··· | AD |
| G | ··┼ \|·\|·· | HDD | 6 | ···┬ \|··· | DH |
| H | ··┼ \|·\|·· | HHA | 7 | ···┬ \|··· | DA |
| I | ··┴ \|·\|·· | AHA | 8 | ···┬ \|··· | DD |
| J | ··┴ \|·\|·· | AHD | 9 | ···+ \|··· | TH |
| K | ··┴ \|·\|·· | AAH | | | |
| L | ··┴ \|·\|·· | AAA | | | |
| M | ··┼ \|·\|·· | HHH | | | |
| N | ··┴ \|·\|·· | ADH | | | |

TABLE 1-continued

| 'A' CHARACTERS | | | 'N' CHARACTERS | |
|---|---|---|---|---|
| Letter | Bars | | Number | Bars |
| O | ..↓ ¦·|·· | ADA | | |
| P | ..↓ ¦·|·· | ADD | | |
| Q | ..↑ |·|·· | DHH | | |
| R | ..↑ |·|·· | DHA | | |
| S | ..↑ |·|·· | DHD | | |
| T | ..↑ |·|·· | DAH | | |
| U | ..↑ |·|·· | DAA | | |
| V | ..↑ |·|·· | DAD | | |
| W | ..↑ |·|·· | DDH | | |
| X | ..↑ |·|·· | DDA | | |
| Y | ..↑ |·|·· | DDD | | |
| Z | ..↓ |·|·· | AHH | | |

TABLE 2

| 'Z' CHARACTERS | | |
|---|---|---|
| Symbol | Bars | |
| Space | ..┼ |·|·· | HHT |
| A | ..↑ |·|·· | HHH |
| B | ..┼ |·|·· | HHA |
| C | ..+ |·|·· | HHD |
| D | ..┼ |·|·· | HAH |
| E | ..+ |·|·· | HAA |
| F | ..┼ |·|·· | HAD |
| G | ..+ |·|·· | HDH |
| H | ..┼ |·|·· | HDA |
| I | ..+ |·|·· | HDD |
| J | ..┼ |·|·· | AHH |

TABLE 2-continued

| 'Z' CHARACTERS | | |
|---|---|---|
| Symbol | Bars | |
| K | ..+ |·|·· | AHA |
| L | ..┼ |·|·· | AHD |
| M | ..+ |·|·· | AAH |
| N | ..┼ |·|·· | AAA |
| O | ..+ |·|·· | AAD |
| P | ..┼ |·|·· | ADH |
| Q | ..+ |·|·· | ADA |
| R | ..┼ |·|·· | ADD |
| S | ..+ |·|·· | DHH |
| T | ..↓ |·|·· | DHA |
| U | ..↓ |·|·· | DHD |
| V | ..↓ |·|·· | DAH |
| W | ..↓ |·|·· | DAA |
| X | ..↓ |·|·· | DAD |
| Y | ..↓ |·|·· | DDH |
| Z | ..↓ |·|·· | DDA |
| 0 | ..↓ |·|·· | DDD |
| 1 | ..↓ |·|·· | THH |
| 2 | ..↑ |·|·· | THA |
| 3 | ..↑ |·|·· | THD |
| 4 | ..↑ |·|·· | TAH |
| 5 | ..↑ |·|·· | TAA |
| 6 | ..↑ |·|·· | TAD |
| 7 | ..↑ |·|·· | TDH |
| 8 | ..↑ |·|·· | TDA |
| 9 | ..↑ |·|·· | TDD |

Note that the encoding shown in Table 1 is used only for the postal code mapping. As seen in Table 1 only the 9 digit contains the tracking element T which because of its size is the most likely of the four elements to be obscured or missing. This minimization of the occurrence of the T bars provides extra security for the Postal Code.

With regard to the "B" bars, these are used only for the Machine ID and can be decoded using a quadral representation with 'n' as the number of bars in the data block and '$V_n$' as the value of each bar in the following equation:

$$B_n B_{n-1} \ldots B_1 = V_n x^{n-1} + V_{n-1} x^{n-2} + \ldots + V_1 x^0$$

The bar values ($V_n$) are assigned as follows: H=0; A=1; D=2; T=3

$$\text{e.g. } ADHA = 1 \times 4^3 + 2 \times 4^2 + 0 \times 4 + 1 \times 4^0$$
$$= 64 + 32 + 0 + 1 = 097$$

For 4 bars, the maximum value is:

$$TTTT = 3 \times 64 + 3 \times 16 + 3 \times 4 + 3 \times 1 = 225$$

Referring to the various data fields shown in FIG. 3, the first field is START which comprises an A bar followed by a T bar. The last field is STOP which also comprises an A bar followed by a T bar. This sequence provides all orientation or direction of flow of the code so that an upside down label or letter inserted backwards can be identified immediately. The sequence also provides an additional marker for synchronization and a unique identifier so that the code can be recognized immediately.

The next field is the DCI (Data Content Identifier) which specifies the structure and the number of data elements within the bar code. When a bar code reader decodes a DCI it will know how to decode the remaining data elements. The DCI can be either an alphabetic or numeric character ("Z" character) encoded using three bars according to Table 2. Within CPC the DCI's are assigned in the following way:

1–9 Reserved for global (international) applications

A–L Reserved for domestic (Canada) applications

M–U Reserved for service applications

V–Z Reserved for internal applications.

The DCI illustrated in FIG. 3 comprises two D bars followed by one A bar and from Table 2 this corresponds to the letter Z. When the DCI is a Z this specifies that there are 6 decodable characters in the form ANANAN for sortation and a binary machine ID in the form BBBB.

This does in fact correspond with FIG. 3 where the next field is the postal code which in Canada is constructed as alternate alphabetic/numerical characters ANANAN with each letter being formed by 3 bars and each number formed of 2 bars as shown in Table 1. The postal code thus consists of 15 bars. By consulting Table 1, it can be seen the postal code in the example illustrated in FIG. 3 is K1A 0B1.

The next field is the Reed-Solomon Parity Check consisting of 30 bars comprising 10 alphanumeric characters Z. The RS code chosen is a (16,6) Reed-Solomon code over GF(64) which can correct 5 symbol errors and up to 10 symbol erasures (30 bars). That is, more than half the bar code could be missing and the remaining bar code would still be successfully decoded. The error correcting capability of this RS code will be discussed in greater detail below.

The next field is the Machine ID field which identifies the particular machine which applied the bar code. The four bars shown in this example are:

$$ADHA = 1 \times 4^3 + 2 \times 4^2 + 0 \times 4^1 + 1 \times 4^0$$
$$= 64 + 32 + 0 + 1 = 097$$

Figure 4A:
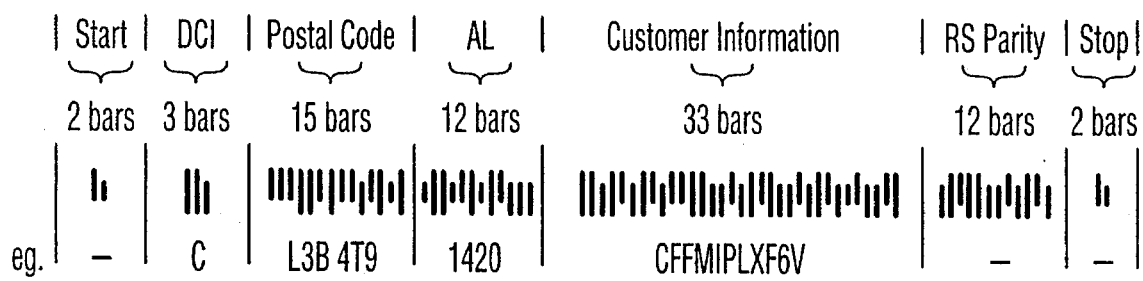
FIG. 4a illustrates another example of a bar code employing the invention.

Turning now to FIG. 4a, this illustrates the format of PostBar.D22 which uses a (25,21) Reed-Solomon code over GF(64). PostBar.D22 is a customer applied bar code for domestic Canadian applications. The data structure may be summarized as follows:

| DATA FIELD | BARS | DATA CHARACTERS |
| --- | --- | --- |
| Start/synchronization | 2 | |
| Data Content Indentifier (DCI) | 3 | Z |
| Postal code (FSA LDU) | 15 | ANANAN |
| Address Locator (AL) | 12 | ZZZZ |
| Customer Information | 33 | ZZZZZZZZZZZ |
| RS Parity Check | 12 | |
| Stop/synchronization | 2 | |
| Total | 79 | |

As for the PostBar.C10 code discussed above, data character A is an alphabetic character denoted by 3 bars, N is a numeric character denoted by 2 bars and Z is an alphanumeric character denoted by 3 bars. Table 1 shows the encoding for the "A" and "N" characters and Table 2 shows the encoding for the "Z" characters.

Referring to the various data fields shown in FIG. 4a, the start and stop fields, the DCI field and the Postal code fields are identical to the corresponding fields in the PostBar.C10 code. In the particular example shown, by consulting Table 2 it will be seen the DCI corresponds to the letter C and by consulting Table 1 it will be seen the Postal code corresponds to L3B 4T9.

When the DCI is a C this specifies that there are 21 decodable characters which follow in the form of the postal code (ANANAN), address locator (ZZZZ) and 11 customer data characters (ZZZZZZZZZZZ).

Unlike PostBar.C10, PostBar.D22 does not have a Machine ID field as the printer applying the code is not a CPC (Canada Post Corporation) machine and is, therefore, of no real interest.

PostBar.D22 has two fields, namely AL and Customer Information, not present in PostBar.C10. The field AL is an address locator field which consists of 12 bars and appears immediately to the right of the Postal Code. The Customer Information field follows and this has 33 bars. These fields are encoded according to alphanumeric Table 2 and so there are 4 characters for the AL field and 11 for the Customer Information field.

Reference should be made to U.S. patent application Ser. No. 888,905 filed on May 26, 1992 and assigned to Canada Post Corporation, which application is incorporated hereby by reference, for a further explanation of the AL and Customer Information fields. More particularly and in brief, the AL field, referred to in the earlier application as PODI (Point of Delivery Indicator) is a suffix to the postal code which is determined from the address on the mail piece as well as the Postal code. The postal code together with the AL allows a mail piece to be sorted for delivery to the specific address. The term POCI (Point of Call Identifier) has been coined for the combination (Postal Code+the Address Locator).

It is noted that the RS Parity field in PostBar.D22 consists of only 12 bars in contrast to the 30 bars of PostBar.C10. This is because more protection is needed for Post Bar.C10 than for PostBar.D22. This results from the fact that the PostBar.C10 is a code printed by CPC on mail pieces which have a great variety of surfaces and background and so there is a likelihood of background noise from extraneous printing or marking. On the other hand PostBar.D22 is applied by the customer who has greater control over the printing surface and so there is less potential for background noise.

From a consideration of Table 2 it can be seen that, for the specific example shown for PostBar.D22, the AL is 1420, and the Customer Information is CFFMIPLXF6V. From a consideration of Table 1 the postal code converts to L3B 4T9.

Figure 4B:
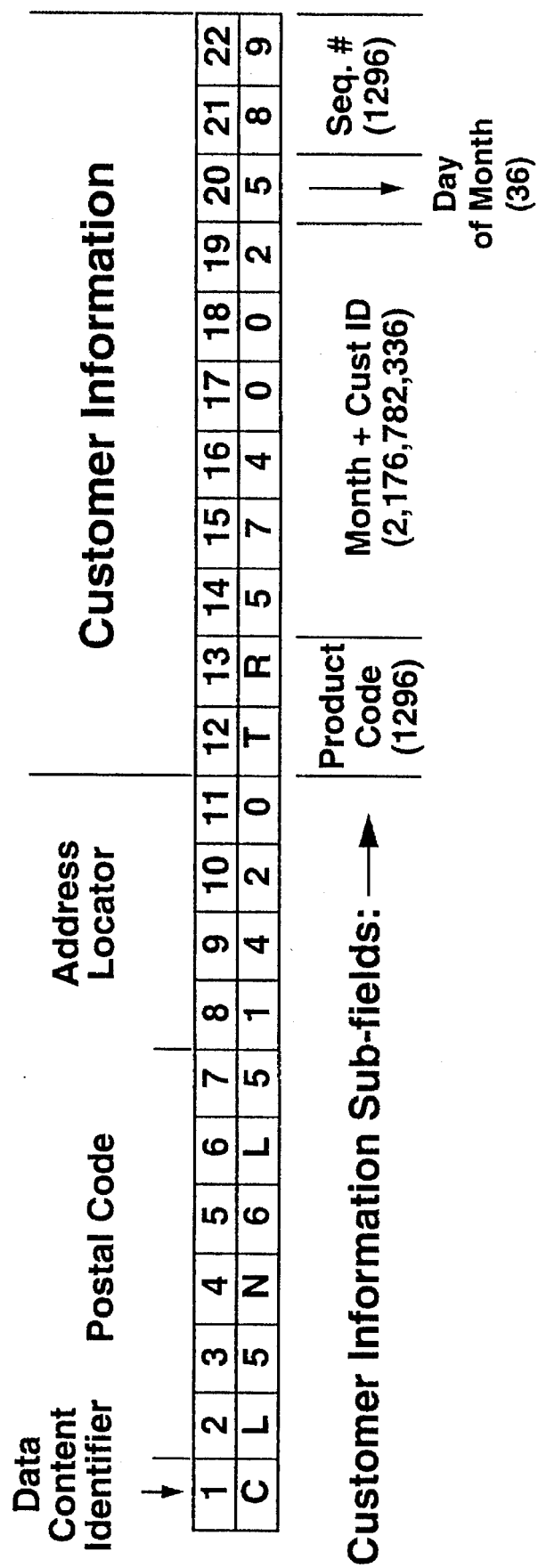
FIG. 4b illustrates a bar code similar to that of FIG. 4a in which the customer field has been broken down into subfields.

FIG. 4b shows how the Customer Information field of FIG. 4a may be broken down into sub-fields. In FIG. 4b the bars are not shown. The customer data can be broken into sub-fields such as those shown. The Product Code identifies the specific customer, the Sequence Number identifies the batch mailed on a particular day and the Month and Day of Month are self-explanatory. This information uniquely identifies a mail piece and allows track and trace of the mail piece as well as revenue accounting for example.

The numbers in the brackets represent the number of combinations possible for each sub-field.

Figure 5:
FIGS. 5 through 11 illustrate further examples of bar codes employing the invention.
Figure 11:
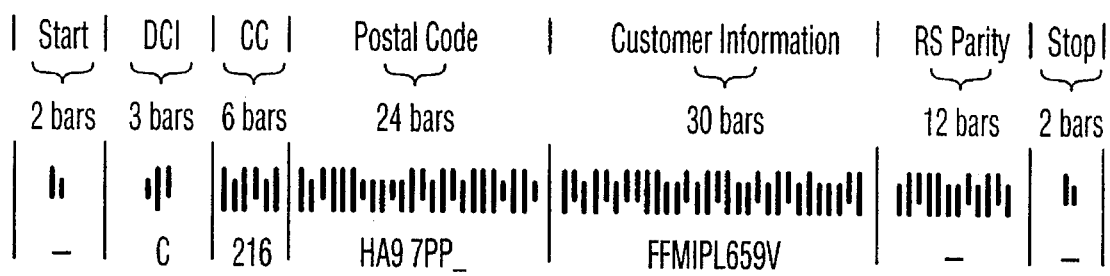

FIG. 5 illustrates an example of an International or Global code, PostBar.G12 which would be used when the mail piece is addressed to another country. This is a (15,11) Reed-Solomon code over GF(64). The format may be summarized as follows:

| DATA FIELD | BARS | DATA CHARACTERS |
|---|---|---|
| Start/synchronization | 2 | |
| Data Content Identifier (DCI) | 3 | Z |
| Country Code (CC) | 6 | NNN |
| Postal code* | 24 | ZZZZZZZZ |
| RS Parity Check | 12 | |
| Stop/synchronization | 2 | |
| Total | 49 | |

*Unused characters in the postal code field will be filled with space characters.

The DCI is determined from Table 2 to be 1 and this specifies that there are 11 decodable characters that follow in the form of a three numeric character country code (NNN) and an 8 character postal code (ZZZZZZZZ).

It is noted that in this code no A or N characters of Table 1 are used for the Postal Code. Also, a new field, namely Country Code, is present and as can be seen by consulting Table 1, for the specific example shown this translates to 180 which may, for example, identify the USA. The postal code or zip code is determined from Table 2 to be 91266 followed by three spaces. For the U.S.A. only 15 bars are needed for the ZIP code but the field is provided with 24 bars because other countries require more than 5 characters for the postal code.

Figure 6:
Figure 7:
Figure 8:
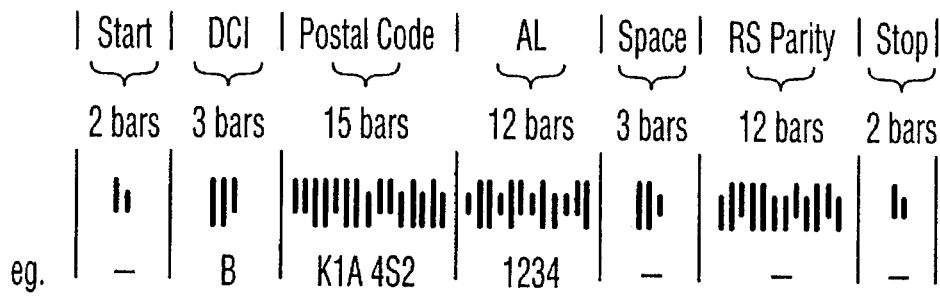
Figure 9:
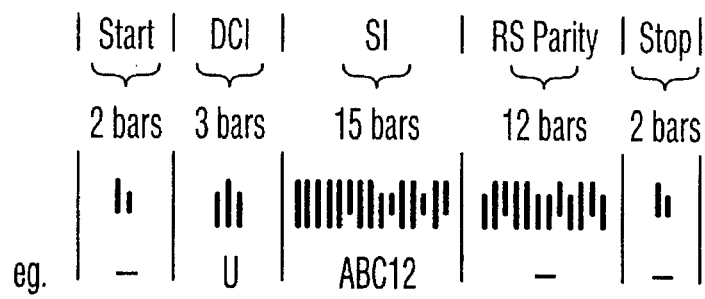
Figure 10:

FIG. 6 illustrates an example of a customer applied service code, PostBar.S21 which is a (25, 21) Reed-Solomon code over GF(64) having a data structure summarized as follows:

| DATA FIELD | BARS | DATA CHARACTERS |
|---|---|---|
| Start/synchronization | 2 | |
| Data Content Identifier (DCI) | 3 | Z |
| Bar Code Sequencer (BCS) | 3 | Z |
| Service Information (SI) | 57 | ZZZZZZZZZZZZZZZZZZZ |
| RS Parity Check | 12 | |
| Stop/synchronization | 2 | |
| Total | 79 | |

As for PostBar.G12 discussed above all the data characters are Z characters obtained from Table 2. The DCI is determined from Table 2 to be S and this specifies that there follows as data a 19 character (57 bars) Service Information field which in this case translates to ABCDEFGHIJ123456789 from Table 2. There is no routing data field because this code is used for special services required by a customer. For example the Service Information field could be used for return mail management or to provide other information useful to the customer.

Between the DCI field and the Service Information field is a Bar Code Sequencer (BCS) field which is a single character consisting of 3 bars that allows the concatenation of two bar codes to encode data longer than 19 characters. When a single 19 character code is used the BCS is DDD which from Table 2 is 0. To indicate the first of two concatenated bar codes the BCS would be chosen to be 1 and to indicate the second of two concatenated bar codes the BCS would be chosen to equal 2.

The operation of the error correcting code (ECC) for PostBar.C10 (FIG. 3) and for PostBar.D22 (FIG. 4a) will now be discussed in greater detail.

The error correcting code (ECC) for PostBar.C10 protects the postal code and DCI but not the machine ID. The ECC is a (16, 6) Reed-Solomon code defined over the field GF(64) with 64 elements. Precisely, the defining roots of the code are $\alpha^i$ for $i=1, 2, \ldots, 10$ where $\alpha$ is a root of $X^6+X+1$. Each codeword consists of 6 message (or information) symbols and 10 check symbols. Each symbol is an element of GF(64) and is represented by 3 bars. The ECC can correct up to t symbols with errors and e erased symbols as long as $2t+e \leq 10$. For example, since each symbol corresponds to 3 bars, an erasure of 30 consecutive bars is correctable. One should be aware that if there are $e=10$ erased symbols then there is no way for the code to detect any additional errors. Any other error in addition to these 10 will force a decoding error. (The constant erase_max in the software can be set less than 10 to stay away from this possibility.)

The error correcting code for PostBar.D22 covers all of the fields except the start and stop bars. The code is a (25, 21) Reed-Solomon code defined over GF(64). It can correct t errors and e erasures in the symbols of the code as long as $2t+e \leq 4$. As before, each code symbol corresponds to 3 bars. The code uses 4 check symbols which contribute 12 bars to the code.

The error correcting code specified for each of the bar codes is a Reed-Solomon code over the field GF(64) with 64 elements. We use a primitive element $\alpha$ of the field GF(64) which is a root of $X^6+X+1$ (over GF(2)). This means that the 63 powers $\alpha^i$, for $i=0, 1, \ldots, 62$ are the 63 distinct non-zero elements of the field. Also the 6 elements $\alpha^0, \alpha^1, \alpha^2, \alpha^3, \alpha^4, \alpha^5$ form a linear basis for the field GF(64). Thus each element w of GF(64) has a unique expression as a sum, $$(*) \quad w = w_5\alpha^5 + w_4\alpha^4 + w_3\alpha^3 + w_2\alpha^2 + w_1\alpha^1 + w_0\alpha^0$$

where each $w_i = 0$ or 1. By using the identity $\alpha^6 = \alpha+1$ any power of $\alpha$ can be expressed in the form (*).

The translation from bar to field elements is accomplished by grouping the bars in sets of three. Each bar corresponds to a pattern of 2 bits:

H=00, A=01, D=10, T=11

A set of three bars corresponds to 6 bits which we take as the values of $w_i$ in the expression (*). So for example, $$TDT \rightarrow 11\ 10\ 11 \rightarrow 1\alpha^5 + 1\alpha^4 + 1\alpha^3 + 0\alpha^2 + 1\alpha^1 + 1\alpha^0 = \alpha^{21}$$

Table 3 displays the correspondence between bar patterns and field elements. In the encoding and decoding software the field elements are represented as integers in the range 0 to 63, (thus as 6 bits). For example, the element $\alpha^{21}$, above, which has bit pattern 111011 corresponds to the integer 59 which is 111011 in binary (59=32+16+8+2+1). In Table 3, the column int gives the integer corresponding to each field element in this way.

TABLE 3

| bars | i | $\alpha^i$ | int | bars | i | $\alpha^i$ | int |
|---|---|---|---|---|---|---|---|
| HHH | ** | 000000 | 0 | DAA | 31 | 100101 | 37 |
| HHA | 0 | 000001 | 1 | HDA | 32 | 001001 | 9 |
| HHD | 1 | 000010 | 2 | AHD | 33 | 010010 | 18 |
| HAH | 2 | 000100 | 4 | DAH | 34 | 100100 | 16 |
| HDH | 3 | 001000 | 8 | HDT | 35 | 001011 | 11 |
| AHH | 4 | 010000 | 16 | AAD | 36 | 010110 | 22 |
| DHH | 5 | 100000 | 32 | DTH | 37 | 101100 | 44 |
| HHT | 6 | 000011 | 3 | ADT | 38 | 011011 | 27 |
| HAD | 7 | 000110 | 6 | TAD | 39 | 110110 | 54 |
| HTH | 8 | 001100 | 12 | DTT | 40 | 101111 | 47 |
| ADH | 9 | 011000 | 24 | ATA | 41 | 011101 | 29 |
| THH | 10 | 110000 | 48 | TDD | 42 | 111000 | 58 |
| DHT | 11 | 100011 | 35 | TAT | 43 | 110111 | 55 |
| HAA | 12 | 000101 | 5 | DTA | 44 | 101101 | 45 |
| HDD | 13 | 001010 | 10 | ADA | 45 | 011001 | 25 |
| AAH | 14 | 010100 | 20 | THD | 46 | 110010 | 50 |
| DDH | 15 | 101000 | 40 | DAT | 47 | 100111 | 39 |
| AHT | 16 | 010011 | 19 | HTA | 48 | 001101 | 13 |
| DAD | 17 | 100110 | 38 | ADD | 49 | 011010 | 26 |
| HTT | 18 | 001111 | 15 | TAH | 50 | 110100 | 52 |
| ATD | 19 | 011110 | 30 | DDT | 51 | 101011 | 43 |
| TTH | 20 | 111100 | 60 | AAA | 52 | 010101 | 21 |
| TDT | 21 | 111011 | 59 | DDD | 53 | 101010 | 42 |
| TAA | 22 | 110101 | 53 | AAT | 54 | 010111 | 23 |
| DDA | 23 | 101001 | 41 | DTD | 55 | 101110 | 46 |
| AHA | 24 | 010001 | 17 | ATT | 56 | 011111 | 31 |
| DHD | 25 | 100010 | 34 | TTD | 57 | 111110 | 62 |
| HAT | 26 | 000111 | 7 | TTT | 58 | 111111 | 63 |
| HTD | 27 | 001110 | 14 | TTA | 59 | 111101 | 61 |
| ATH | 28 | 011100 | 28 | TDA | 60 | 111001 | 57 |
| TDH | 29 | 111000 | 56 | THA | 61 | 110001 | 49 |
| THT | 30 | 110011 | 51 | DHA | 62 | 100001 | 33 |

The coded portion is divided into blocks of three bars. Each block represents one element of the field. The ECC runs from right to left across the bars. We set $c_i = b_{47-3i} b_{48-3i} b_{49-3i}$.

Thus we have:

$$\underbrace{b_0 b_1}_{start}\ \underbrace{b_2 b_3 b_4}_{c_{15}}\ \underbrace{b_5 b_6 b_7}_{c_{14}} \ldots \underbrace{b_{44} b_{45} b_{46}}_{c_1}\ \underbrace{b_{47} b_{48} b_{49}}_{c_0}\ \underbrace{b_{50} b_{51} b_{52} b_{53}}_{machine\ ID}\ \underbrace{b_{54} b_{55}}_{stop}$$

Using these 16 elements $c_0, \ldots, c_{15}$ of GF(64) the ECC is defined by specifying that a codeword must satisfy:

(**) $\sum_{i=0}^{15} c_i \alpha^{ij} = 0$ for $j = 1, 2, \ldots, 10$

The equation represents 10 equations with 10 unknown coefficients which is solved by the computer bar code generating software.

Using the symbology defined above, we record the postal code (PC) in bars $b_5 \ldots b_{19}$ hence in elements $c_{14}, \ldots, c_{10}$. The DCI goes in bars $b_2 b_3 b_4$ hence in $c_{15}$. The check symbols $c_0, \ldots, c_9$ are now uniquely determined by the parity checks (**).

For example, DCI=Z, postal code K1S 5B6, mach ID—DHAH encodes to the following codeword:

18 29 12 5 14 27 52 54 4 6 8 33 9 6 20 41

$c_0 \ldots$ $\ldots c_{15}$

Table 2 then produces the bar code

AT DDA AAH HAD HDA DHA HDH HAD HAH TAD

TAH ADT HTD HAA HTH ATA AHD DHAH AT

Reorganized into A- and N- fields this is

AT DDA AAH HA DHD AD HAH DH

Start DCI Postal Code -ANANAN

HAD HAH TAD TAH ADT HTD HAA HTH ATA AHD DHAH AT checks        mach ID stop

For the CPC internal bar code, PostBar.C10, the 56 bars are arranged as follows:

$\underbrace{b_0 b_1}_{start}\ \underbrace{b_2 b_3 \ldots b_{49}}_{coded\ portion}\ \underbrace{b_{50} b_{51} b_{52} b_{53}}_{machine\ ID}\ \underbrace{b_{54} b_{55}}_{stop}$ The Domestic Bar Cods, PostBar.D22 is similar in definition to the CPC Internal code. All of the 79 bars of the Customer Code, except for the 4 start/stop bars are covered by the ECC. Again the bars correspond to field elements in sets of 3. Thus field element $c_i = b_{74-3i} b_{75-3i} b_{76-3i}$. We have:

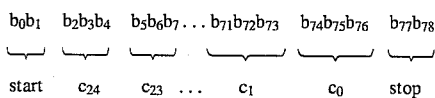

Using these 25 elements $c_0, \ldots, c_{24}$ of GF(64) the ECC for the Customer Code is defined by specifying that a codeword must satisfy:

(***)  $\sum_{i=0}^{24} c_i \alpha^{ij} = 0$ for $j = 1, 2, 3, 4$

This equation represents 4 equations with 4 unknown coefficients which is solved by the computer bar code generating software.

Using the symbology defined above, we record the DCI in bars $b_2 b_3 b_4$ hence in the element $c_{24}$. The postal code is placed in bars $b_5$ to $b_{19}$ hence in the elements $c_{23}, \ldots c_{19}$. The Address Locator (AL) goes in bars $b_{20}, \ldots b_{31}$ hence in $c_{18}, \ldots, c_{15}$. The customer field goes in bars $b_{32}, \ldots, b_{64}$ hence in $c_{14}, \ldots, c_4$. The check symbols $c_0, \ldots c_3$ are now uniquely determined by the parity checks (***), For example, DCI=C, Postal Code=M4J 3W8, AL-1420, Cust field=ABCDEFGHIJK encodes the following codeword:

40  30  23  4  17  16  10  9  8  6  5  4  2  1  42  49  52  48  10  10  9  21  02

$c_0$ ...                                                                   ... $c_{24}$

Using Table 3 to change from integer representation to bars produces the bar code:

AT HHD HHH AAA HDA HDD HDD THH TAH THA DDD HHA HHH

HHD HAH HAA HAD HDH HDA HDD AHH AHA HAH AAT ATD DDH AT

This breaks down into A-, N-, and Z-fields as:

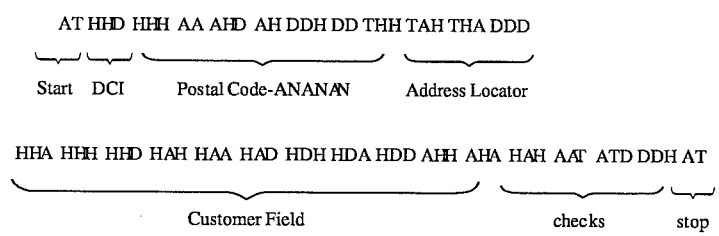

The checks do not follow any of the Table 1 or 2 symbologies but are simply field elements coded as in Table 3.

It is noted that in a (16,6) Reed-Solomon code the probability of a random pattern being a valid codeword is $p = 3.78 \times 10^{-6}$. Moreover, for PostBar.C10 the letters D,F,I, O,Q, or U currently do not appear in the bar codes and W or Z do not appear as the first letters of the code. There are 64 possible 3 bar system patterns, and only 20 are used for postal code letters. The digits for the postal code are encoded as 2 bar patterns, and only 10 of 16 are used. This gives a probability of:

$$\frac{18}{64} \times \frac{10}{16} \times \frac{20}{64} \times \frac{10}{16} \times \frac{20}{64} \times \frac{10}{16} = .0067$$

or about ½ of 1% that a random sequence of bars is a valid postal code. Combining this with p above gives a probability of $2.5 \times 10^{-8}$ or 1 chance in 40,000,000 that a random string of bars will be interpreted as a valid postal code. Other internal checks, such as the use of the code type, will reduce this probability even further. This information should be incorporated into the OCR software.

FIGS. 7 through 11 respectively illustrate the format of PostBar.D07, D12, S06, S11 and G22. These structures will not be described herein as they will be readily understood from the foregoing description.

It should be understood that the inherent flexibility of the new code permits of many more applications than described and illustrated herein and the particular applications described are to be considered representative only.

Furthermore, it is envisaged that data compression techniques may be used to accommodate longer messages than currently provided for with PostBar.D07, D12 and D22. Data compression could also be used with the G and S codes.

Where data compression is used, it is likely the DCI will not be compressed so as to allow speedy determination of the make-up of the bar code. An example is the case of a service bar code present on a mail item that is being processed for sortation. As there is no sortation data in S codes, once the DCI is derived, the machine logic knows that no further decoding is required to process and decompress the data.

Suitable software listing for encoding of PostBar.C10, for encoding of PostBar.D07, D12 and D22, for decoding PostBar.C10, for decoding PostBar.D07, D12 and D22 follow:

```
Program Listing - 94-10-12
Encoder for Postbar.C10 include <stdio.h>
include <math.h>

/*Constants */
const int n = 16, m = 10; /*code length and number of check symbols */
const int N = 56; /* code length on bars */
const int bad_char = 35;/* code for bad output characters (print as "#") */
const int DCI_C10 = 90; /* DCI = "Z" for POSTBAR.C10 */

/* Define constants for printing bar codes (in printer units) */
const int xsize = 5;  /* width of the bars */
const int hsize = 60; /* height of Big bars */
const int asize = 22; /* height of ascender */
const int tsize = 15; /* track size */
const int dsize = 22; /* height of the descender */
const int xstep = 13; /* advance to next bar position */

/* Define constants for label printing (in printer units) */
const int nrows = 7;
const int ncols = 2;
const int xinit = 60;   /* left offset to first label */
const int yinit = 50;   /* down offset to first label */
const int xincr = 1240; /* horizontal label spacing */
const int yincr = 450;  /* vertical spacing of labels */
const int zincr = 8;    /* space between bars and text */

/*Global Variables */

/*Static Variables: defined by setup(); used by decode_the_bars() */
int prod[64] [64], inv[64], alog[64]; /*mult., inv. and anti-log. tables */
int Atable[26];  /* the 6 bit (field representation) of letters using A table */
int Aletter[64]; /* the inverse of the table Atable[] */
int Ntable[10];  /* the 4 bit representations of the digits using N table */
int Ndigit[16];  /* the inverse of Ntable[] */
int Ztable[37];  /* The 6 bit representations of alphanumerics using Z table */
int Zchar[64];   /* inverse of the Ztable[] */
int alpha[10];   /* defining roots for the code */

/*Dynamic Variables: output from encode_to_bars() */
int bars[56];    /* holds the bar code pattern in numbers */
char pcode[20];  /* holds the input string */ char postal_code[6];  /* holds the postal code in ascii */
char DCI;  /* holds the DCI in ascii */
char AL[4]; /* holds the Address Locator in ascii */
char CustField[11]; /* holds the Customer Field in ascii */

/* Dynamic: additional inputs for printing */
char item_number[4];
```

```c
char customer_name[25];
char inward_address[35];
char outward_address[30];

/* Function Prototypes */
void setup(void); /* builds the tables; */
void encode_to_bars(void); /* decodes the bars into postal data */
void new_pcode(char *); /* gets new data */
void initprn(void); /* initializes the printer */
void print_bars(int x, int y); /* generates bar codes at the given location */ int by_alpha(int u); /* utility that multiplies u by alpha in the finite field */
int shift(int u); /* utility that shifts ascii values for use in Atable, Ntable */
int zshift(int u); /* utility that shifts ascii values for use in Ztable */ int verbose = 0; /* print debug information */
int output_bars = 0;

/* Main Program */ int main(argc,argv)

int argc;
char *argv[];

{
int i,count,curx,cury,num,nline;
int hh,vv;
int xx,yy,zz;
FILE *fd;
char *cp;
char buf[1024];

if (argc < 2) {
   printf("Encoder program for the C10 code. (batch version).\n");
   printf("This program prints 7x2 up labels on an HP Laserjet printer.\n\n");

printf("Usage: bpencc10 [-b] [-t] [-h #] [-v #] [-x #] [-y #] [-z #] filename
   printf("  h is the initial horizontal offset (default %d).\n",xinit);
   printf("  v is the initial vertical offset (default %d).\n",yinit);
   printf("  x is the inter-label horizontal spacing (default %d).\n",xincr);
   printf("  y is the inter-label vertical spacing (default %d).\n",yincr);
   printf("  z is the space between the bars and the text (default %d).\n",zincr
   printf("  # is dot positions in printer units (300 DPI).\n");
   printf("  t requests that information be printed to the screen.\n");
   printf("  b requests only bar code numbers be printed to the screen.\n");
   exit();
}
hh = xinit;
vv = yinit;
xx = xincr;
yy = yincr;

/* process command line arguments */ for (i=1; i<argc; i++)
   if (strcmp(argv[i],"-t") == 0)
      ++verbose;
   else if (strcmp(argv[i],"-b") == 0)
```

-24-

```c
        ++output_bars;
      else if (strcmp(argv[i],"-h") == 0)
        hh = atoi(argv[++i]);
      else if (strcmp(argv[i],"-v") == 0)
        vv = atoi(argv[++i]);
      else if (strcmp(argv[i],"-x") == 0)
        xx = atoi(argv[++i]);
      else if (strcmp(argv[i],"-y") == 0)
        yy = atoi(argv[++i]);
      else if (strcmp(argv[i],"-z") == 0)
        zz = atoi(argv[++i]);
      else
        cp = argv[i];

fd = fopen(cp,"r");
  if (!fd) {
     printf("Unable to open file %s.\n",cp);
     exit();
  }
  setup();

if (verbose && !output_bars) {
     printf("===================================================\n");
     printf("August 15, 1994\n");
     printf("Encoding Program for the C10 code.\n");
  } if (!verbose && !output_bars) initprn();

num = nrows * ncols; /* number of labels on the page */
  count = 0;
  nline = 0;
  while (fgets(buf,sizeof(buf),fd)) {
     ++nline;
     if (strlen(buf) < 116) {
        for (i=0; i<strlen(buf); ++i)
           if (buf[i] != ' ') break;
        if ((++i) == strlen(buf)) continue; /* skip blank lines */
        fprintf(stderr,"ERROR - Invalid input at line %d.\n",nline);
        exit();
     }
     new_pcode(buf);
     encode_to_bars();
     ++count;
     curx = hh + xx * (1 - (count % 2));
     cury = vv + yy * (int) (((count - 1) % num) / 2);
     if (verbose && !output_bars)
        printf("\nPrinting next label at (%d,%d).\n",curx,cury);
     print_bars(curx,cury);
        if ((count % num) == 0)
        if (!verbose && !output_bars) fprintf(stdprn,"%c",12);
  }
  if ((count % num))
     if (!verbose && !output_bars) fprintf(stdprn,"%c",12);
}

/* =================================================== */
/* Initialization Routines                              */
/* =================================================== */
```

```
void initprn(void)
{
int temp,i;

fprintf(stdprn,"%cE",27);             /* resets printer */
fprintf(stdprn,"%c*t300R",27);        /* seting up resolution */
fprintf(stdprn,"%c&lefloP",27);       /* sets various defaults */
fprintf(stdprn,"%c&a1M",27);          /* more of the same */

} int by_alpha(int u)
{
u = (u << 1);
if (u > 63) u =u^67;
return(u);
} int shift(int u)  /* changes ascii to indices for A and N tables */
{ if(u>64) u-=65;
else u -= 48;
return(u);
} int zshift(int u)  /* changes ascii to indices for Z table */
{ if(u>64) u-=65;
else if (u==32) u=36;
else u -= 22;
return(u);
}
void setup(void) /* The look-up tables are created */
{
int w0, w1;
int i, j, k, u, v;

/* Initialize the look-up symbology tables  */
/* The tables Atable[], Ntable[], Ztable[] convert a shifted ascii */
/* argument to the representations for the A,N and Z fields respectively. */
/* Shfted ascii means (ascii -65) for A .. Z and (ascii - 48) for 0..9 */

Atable[0] = 2; Atable[1] = 4; Atable[2] = 5; Atable[3] = 6;
Atable[4] = 8; Atable[5] = 9; Atable[6] = 10; Atable[7] = 1;
Atable[8] = 17; Atable[9] = 18; Atable[10] = 20; Atable[11] = 21;
Atable[12] = 0; Atable[13] = 24; Atable[14] = 25; Atable[15] = 26;
Atable[16] = 32; Atable[17] = 33; Atable[18] = 34; Atable[19] = 36;
Atable[20] = 37; Atable[21] = 38; Atable[22] = 40; Atable[23] = 41;
Atable[24] = 42; Atable[25] = 16;

for(k=0; k<64; k++) Aletter[k] = bad_char; /* unsuitable characters print as # *
for(k=0; k<26; k++) Aletter[Atable[k]] = k+65;

Ntable[0] = 0; Ntable[1] = 1; Ntable[2] = 2; Ntable[3] = 4; Ntable[4] = 5;
Ntable[5] = 6; Ntable[6] = 8; Ntable[7] = 9; Ntable[8] = 10; Ntable[9] = 12;

for(k=0; k<16; k++) Ndigit[k] = bad_char; /* unsuitable characters print as # */
for(k=0; k<10;k++) Ndigit[Ntable[k]] = k+48;

Ztable[0] = 0; Ztable[1] = 1; Ztable[2] = 2; Ztable[3] = 4; Ztable[4] = 5;
Ztable[5] = 6; Ztable[6] = 8; Ztable[7] = 9; Ztable[8] = 10; Ztable[9] = 16;
Ztable[10] = 17;Ztable[11] = 18;Ztable[12] = 20;Ztable[13] = 21;Ztable[14] = 22;
```

```
Ztable[15] = 24;Ztable[16] = 25;Ztable[17] = 26;Ztable[18] = 32;Ztable[19] = 33;
Ztable[20] = 34;Ztable[21] = 36;Ztable[22] = 37;Ztable[23] = 38;Ztable[24] = 40;
Ztable[25] = 41;Ztable[26] = 42;Ztable[27] = 48;Ztable[28] = 49;Ztable[29] = 50;
Ztable[30] = 52;Ztable[31] = 53;Ztable[32] = 54;Ztable[33] = 56;Ztable[34] = 57;
Ztable[35] = 58;Ztable[36] = 3;

for(k=0; k < 64; k++) Zchar[k] = bad_char; /* unsuitable characters print as # */
for(k=0; k<26; k++) Zchar[Ztable[k]] = k + 65; /* ascii for the letters */
for(k=26; k<36; k++) Zchar[Ztable[k]] = k + 22; /* ascii for the digits */
Zchar[3] = 32; /* ascii for a space */

/* the prod[][] and inv[] tables are defined */
for(k = 0; k < 64;k++) {prod[0][k] = 0; prod[1][k] = k;} w0 = 1; alog[0] = 1;
for(u=1;u<64;u++)
        {w1 = by_alpha(w0);
        alog[u] = w1;
        for(v=0;v<64;v++)
                {
                prod[w1][v] = by_alpha(prod[w0][v]);
                if (prod[w1][v] == 1) inv[w1] = v;
                }
        w0 = w1;}

/* These are the codes for the roots of the generator poly. */
/* They are alpha^1, ... , alpha^10. */
for (k=0;k<m;k++) alpha[k] = alog[k+1];

return;
}

/* ================================================== */
/* Makes Input for the Encoder */
/* ================================================== */ void new_pcode(char *buf)
{
strncpy (item_number,buf,4);
strncpy (customer_name,&buf[4],25);
strncpy (inward_address,&buf[29],35);
strncpy (outward_address,&buf[64],30);
strncpy (postal_code,&buf[94],6);
DCI = buf[100];
strncpy (AL,&buf[101],4);
strncpy (CustField,&buf[105],11);

/* Transfer the data to pcode for further processing */ pcode[0] = DCI_C10;
strncpy (&pcode[1],postal_code,6);
strncpy (&pcode[7],AL,4);
return;
} void encode_to_bars(void)
{/* This routine encodes pcode[] as a bar pattern in bars[] */
int i,j,k,zeta; /*loop variables */
int deg_gen; /* holds the degree of the generator polynomial */
int mess[21]; /*the 21 message or information symbols */
```

-27-

```
int gen[26]; /*the generator polynomial */
int codeword[26]; /* codeword produced by the encoder */
int bars_copy[79];/* holds a copy of the bar pattern */

/*================================================== */
/*                   Data Converter */
/* The DCI, postal code and data fields (if any) */
/* are converted to a series of n-m field elements */
/* placed in mess[0] .. mess[n-m-1] ready for the encoder. */

/* DCI is put in mess[n-m-1] */
mess[n-m-1] = Ztable[zshift((int) pcode[0])];

/* Repack the Postal Code */
mess[n-m-2] = Atable[shift((int) pcode[1])];
mess[n-m-3] = (Ntable[shift((int) pcode[2])]<<2)^(Atable[shift((int) pcode[3])]>
mess[n-m-4] = ((Atable[shift((int) pcode[3])]&15)<<2)^(Ntable[shift((int) pcode[
mess[n-m-5] = ((Ntable[shift((int) pcode[4])]&3)<<4)^(Atable[shift((int) pcode[5
mess[n-m-6] = ((Atable[shift((int) pcode[5])]&3)<<4)^Ntable[shift((int) pcode[6]

for(j=n-m-7;j>=0;j--) mess[j] = Ztable[zshift((int)pcode[n-m-j])];

/*================================================== */
/*                Error Correction Encoder */
/* The message is in the form of n-m field elements mess[0] ... mess[n-m-1]. */
/* These go into codeword[m]...codeword[n-1], while the check */
/* symbols go into codeword[0]...codeword[m-1]. */ for(i=0;i<m;i++) codeword[i] = 0;
for(i=m;i<n;i++) codeword[i] = mess[i-m];

/* The generator polynomial is defined. */
deg_gen = 0;gen[0]=1;
for (j = 0;j<m;j++)
        {deg_gen++; gen[deg_gen] = 1;
        for(i=deg_gen-1;i >0;i--) gen[i] = prod[gen[i]][alpha[j]]^gen[i-1];
        gen[0] = prod[gen[0]][alpha[j]];
        } for(zeta = n-m-1; zeta >=0; zeta--)
        {
        for(k = 0; k <= m ; k++)
                {codeword[zeta + k]
                      = codeword[zeta + k] ^ (prod[gen[k]][codeword[m + zeta]]
                }
        }
for(i=m;i<n;i++) codeword[i] = mess[i-m]; /* restore the high order symbols */

/*================================================== */
/*                    Barcode Maker */
/*================================================== */
/* This routine takes codeword[0..n-1] and produces the barcode pattern. */
/* The pattern is placed in bars[] as numbers from (0,1,2,3)=(H,A,D,T) */

/* The start and stop bars are put in place. */
bars[0] = bars[N-2] = 1;
bars[1] = bars[N-1] = 3;

/* Put the machine ID bars in bars[50],...,bars[53] coded as 0,1,2,3 */
```

```
    for(i=0; i < 4; i++)
         switch((int)pcode[i+7])
                    {case 72: {bars[50+i] = 0;break;}
                    case 68: {bars[50+i] = 2;break;}
                    case 84: {bars[50+i] = 3;break;}
                    case 65: {bars[50+i] = 1;}
                    }
/* The codeword[] is made into bars starting with codeword[n-1] */
/* and working down. */
/* This puts the checks at the right hand end of the barcode. */ for(j=2,k=n-1; k>=0;j+=3,k--)
         {bars[j] = codeword[k] >> 4;
         bars[j+1] = (codeword[k]>>2)&3;
         bars[j+2] = codeword[k]&3;
         }
return;
}

/* ===================================================== */
/* Print the Barcode  */
/* ===================================================== */
/* This routine prints out the bar pattern using vertical rules */ void print_bars(int x, int y)
{
int j,ht,yy;

if (verbose || output_bars) {
  for (j = 0; j < N; j++) printf("%d",bars[j]);printf("\n");
  return;
} for (j=0; j<N; j++) {
       if (bars[j] == 0) {
              ht = hsize;
              yy = y - asize - tsize;
       } else if (bars[j] == 1) {
              ht = asize + tsize;
              yy = y - asize - tsize;
       } else if (bars[j] == 2) {
              ht = tsize + dsize;
              yy = y - tsize;
       } else if (bars[j] == 3) {
              ht = tsize;
              yy = y - tsize;
       }
       fprintf(stdprn,"%c*p%dx%dY",27,x,yy);
       fprintf(stdprn,"%c*c%da%db0P",27,xsize,ht);
       x = x + xstep;
}
}
```

-29-

Program Listing - 94-10-12
Encoder for Postbar.D07, Postbar.D12 and Postbar.D22.

```c
#include <stdio.h>
include <math.h>

/* Constants */
const int m = 4; /* number of check symbols */
const int bad_char = 35; /* code for bad characters (print as "#") */ define DCI_D07 65
define DCI_D12 66
#define DCI_D22 67

/* Define constants for printing bar codes (in printer units) */
const int xsize = 5;  /* width of the bars */
const int hsize = 60; /* height of Big bars */
const int asize = 22; /* height of ascender */
const int tsize = 15; /* track size */
const int dsize = 22; /* height of the descender */
const int xstep = 13; /* advance to next bar position */

/* Define constants for label printing (in printer units) */
const int nrows = 7;
const int ncols = 2;
const int xinit = 60;   /* left offset to first label */
const int yinit = 50;   /* down offset to first label */
const int xincr = 1240; /* horizontal label spacing */
const int yincr = 450;  /* vertical spacing of labels */
const int zincr = 8;    /* space between bars and text */

/* Global Variables */

/* Static Variables: defined by setup(); used by decode_the_bars() */
int prod[64] [64], inv[64], alog[64]; /* mult., inv. and anti-log. tables */
int Atable[26];  /* the 6 bit (field representation) of letters using A table */
int Aletter[64]; /* the inverse of the table Atable[] */
int Ntable[10];  /* the 4 bit representations of the digits using N table */
int Ndigit[16];  /* the inverse of Ntable[] */
int Ztable[37];  /* The 6 bit representations of alphanumerics using Z table */
int Zchar[64];   /* inverse of the Ztable[] */
int alpha[4];    /* defining roots for the error correcting code */

/* Dynamic Variables: input/output for encode_to_bars() */
int bars[79]; /* holds the bar code pattern in numbers */
char pcode[40];  /* holds the input string */ char postal_code[6]; /* holds the postal code in ascii */
char DCI; /* holds the DCI in ascii */
char AL[4]; /* holds the Address Locator in ascii */
char CustField[11]; /* holds the Customer Field in ascii */
```

```c
/* Dynamic additional inputs for printing */
char item_number[4];
char customer_name[25];
char inward_address[35];
char outward_address[30];

/* Function Prototypes */

/* principal routines */
void setup(void); /* builds the tables; */
void encode_to_bars(void); /* encodes the data as a barcode D07, D12 or D22 */
void new_pcode(char *); /* gets new data */
void initprn(void); /* initializes the printer */
void print_bars(int x, int y); /* generates bar codes at the given location */
void print_text(int x, int y, int z); /* prints name and address information */
/* utilities used by setup() */
int by_alpha(int u); /* utility that multiplies u by alpha in the finite field */
int shift(int u); /* utility that shifts ascii values for use in Atable, Ntable */
int zshift(int u); /* utility that shifts ascii values for use in Ztable */ int verbose = 0; /* print debug information */
int output_bars = 0;

/* Main Program */ int main(argc,argv)

int argc;
char *argv[];

{
int i,count,curx,cury,num,nline;
int hh,vv;
int xx,yy,zz;
FILE *fd;
char *cp;
char buf[1024];

if (argc < 2) {
    printf("Encoder program for the D code family (batch version).\n");
    printf("This program prints 7x2 up labels on an HP Laserjet printer.\n\n");
    printf("Usage: bpencd [-b] [-t] [-h #] [-v #] [-x #] [-y #] [-z #] filename\n
    printf("   h is the initial horizontal offset (default %d).\n",xinit);
    printf("   v is the initial vertical offset (default %d).\n",yinit);
    printf("   x is the inter-label horizontal spacing (default %d).\n",xincr);
    printf("   y is the inter-label vertical spacing (default %d).\n",yincr);
    printf("   z is the space between the bars and the text (default %d).\n",zincr);
    printf("   # is dot positions in printer units (300 DPI).\n");
    printf("   t requests that information be printed to the screen.\n");
    printf("   b requests only bar code numbers be printed to the screen.\n");
    exit();
}
hh = xinit;
vv = yinit;
xx = xincr;
yy = yincr;
zz = zincr;

/* process command line arguments */
```

```c
for (i=1; i<argc; i++)
   if (strcmp(argv[i],"-t") == 0)
      ++verbose;
   else if (strcmp(argv[i],"-b") == 0)
      ++output_bars;
   else if (strcmp(argv[i],"-h") == 0)
      hh = atoi(argv[++i]);
   else if (strcmp(argv[i],"-v") == 0)
      vv = atoi(argv[++i]);
   else if (strcmp(argv[i],"-x") == 0)
      xx = atoi(argv[++i]);
   else if (strcmp(argv[i],"-y") == 0)
      yy = atoi(argv[++i]);
   else if (strcmp(argv[i],"-z") == 0)
      zz = atoi(argv[++i]);
   else
      cp = argv[i];

fd = fopen(cp,"r");
if (!fd) {
   printf("Unable to open file %s.\n",cp);
   exit();
}
setup();

if (verbose && !output_bars) {
   printf("==================================================\n");
   printf("August 15, 1994\n");
   printf("Encoding Program for the D codes.\n");
} if (!verbose && !output_bars) initprn();

num = nrows * ncols; /* number of labels on the page */
count = 0;
nline = 0;
while (fgets(buf,sizeof(buf),fd)) {
   ++nline;
   if (strlen(buf) < 116) {
      for (i=0; i<strlen(buf); ++i)
         if (buf[i] != ' ') break;
      if ((++i) == strlen(buf)) continue; /* skip blank lines */
      fprintf(stderr,"ERROR - Invalid input at line %d.\n",nline);
      exit();
   }
   new_pcode(buf);
   encode_to_bars();
   ++count;
   curx = hh + xx * (1 - (count % 2));
   cury = vv + yy * (int) (((count - 1) % num) / 2);
   if (verbose && !output_bars)
      printf("\nPrinting next label at (%d,%d).\n",curx,cury);
   print_bars(curx,cury);
   if (!output_bars) print_text(curx,cury,zz);
   if ((count % num) == 0)
      if (!verbose && !output_bars) fprintf(stdprn,"%c",12);
}
if ((count % num))
   if (!verbose && !output_bars) fprintf(stdprn,"%c",12);
}
```

-32-

```
/* ================================================== */
/* Initialization Routines                            */
/* ================================================== */ void initprn(void)
{
int temp,i;

fprintf(stdprn,"%cE",27);                /* resets printer */
fprintf(stdprn,"%c*t300R",27);           /* seting up resolution */
fprintf(stdprn,"%c&lefloP",27);          /* sets various defaults */
fprintf(stdprn,"%c&alM",27);             /* more of the same */
} int by_alpha(int u)
{
u = (u << 1);
if (u > 63) u =u^67;
return(u);
} int shift(int u)  /* changes ascii to indices for A and N tables */
{ if(u>64) u-=65;
else u -= 48;
return(u);
} int zshift(int u)  /* changes ascii to indices for Z table */
{ if(u>64) u-=65;
else if (u==32) u=36;
else u -= 22;
return(u);
} void setup(void)  /* The look-up tables are created */
{
int w0, w1;
int i, j, k, u, v;

/* Initialize the look-up symbology tables */
/* The tables Atable[], Ntable[], Ztable[] convert a shifted ascii */
/* argument to the representations for the A,N and Z fields respectively. */
/* Shfted ascii means (ascii -65) for A .. Z and (ascii - 48) for 0..9 */

Atable[0] = 2; Atable[1] = 4; Atable[2] = 5; Atable[3] = 6;
Atable[4] = 8; Atable[5] = 9; Atable[6] = 10; Atable[7] = 1;
Atable[8] = 17; Atable[9] = 18; Atable[10] = 20; Atable[11] = 21;
Atable[12] = 0; Atable[13] = 24; Atable[14] = 25; Atable[15] = 26;
Atable[16] = 32; Atable[17] = 33; Atable[18] = 34; Atable[19] = 36;
Atable[20] = 37; Atable[21] = 38; Atable[22] = 40; Atable[23] = 41;
Atable[24] = 42; Atable[25] = 16;

for(k=0; k<64; k++) Aletter[k] = bad_char; /* unsuitable characters print as # *
for(k=0; k<26; k++) Aletter[Atable[k]] = k+65;

Ntable[0] = 0; Ntable[1] = 1; Ntable[2] = 2; Ntable[3] = 4; Ntable[4] = 5;
Ntable[5] = 6; Ntable[6] = 8; Ntable[7] = 9; Ntable[8] = 10; Ntable[9] = 12;
```

```
    for(k=0; k<16; k++) Ndigit[k] = bad_char; /* unsuitable characters print as # */
    for(k=0; k<10;k++) Ndigit[Ntable[k]] = k+48;

Ztable[0]  = 0; Ztable[1]  = 1; Ztable[2]  = 2; Ztable[3]  = 4; Ztable[4]  = 5;
    Ztable[5]  = 6; Ztable[6]  = 8; Ztable[7]  = 9; Ztable[8]  = 10; Ztable[9]  = 16;
    Ztable[10] = 17;Ztable[11] = 18;Ztable[12] = 20;Ztable[13] = 21;Ztable[14] = 22;
    Ztable[15] = 24;Ztable[16] = 25;Ztable[17] = 26;Ztable[18] = 32;Ztable[19] = 33;
    Ztable[20] = 34;Ztable[21] = 36;Ztable[22] = 37;Ztable[23] = 38;Ztable[24] = 40;
    Ztable[25] = 41;Ztable[26] = 42;Ztable[27] = 48;Ztable[28] = 49;Ztable[29] = 50;
    Ztable[30] = 52;Ztable[31] = 53;Ztable[32] = 54;Ztable[33] = 56;Ztable[34] = 57;
    Ztable[35] = 58;Ztable[36] = 3;

for(k=0; k < 64; k++) Zchar[k] = bad_char; /* unsuitable characters print as # *
    for(k=0; k<26; k++) Zchar[Ztable[k]] = k + 65;  /* ascii for the letters */
    for(k=26; k<36; k++) Zchar[Ztable[k]] = k + 22; /* ascii for the digits */
    Zchar[3] = 32; /* ascii for a space */

/* the prod[][] and inv[] tables are defined */
    for(k = 0; k < 64;k++) {prod[0][k] = 0; prod[1][k] = k;} w0 = 1; alog[0] = 1;
    for(u=1;u<64;u++)
            {w1 = by_alpha(w0);
            alog[u] = w1;
            for(v=0;v<64;v++)
                    {
                    prod[w1][v] = by_alpha(prod[w0][v]);
                    if (prod[w1][v] == 1) inv[w1] = v;
                    }
            w0 = w1;}

/* These are the codes for the roots of the generator poly. */
    /* They are alpha^1, ... , alpha^10. */
    for (k=0;k<m;k++) alpha[k] = alog[k+1];

return;
    }
/* ================================================== */
/* Makes Input for the Encoder */
/* ================================================== */ void new_pcode(char *buf)
{
int i;

strncpy (item_number,buf,4);
strncpy (customer_name,&buf[4],25);
strncpy (inward_address,&buf[29],35);
strncpy (outward_address,&buf[64],30);
strncpy (postal_code,&buf[94],6);
DCI = buf[100];
strncpy (AL,&buf[101],4);
strncpy (CustField,&buf[105],11);

/* Transfer the data to pcode for further processing */ pcode[0] = DCI; /* Assume input record contains valid DCI */
strncpy (&pcode[1],postal_code,6);
strncpy (&pcode[7],AL,4);
strncpy (&pcode[11],CustField,11);
```

-34-

```
         if (!verbose) return;

switch(pcode[0])
             {case DCI_D07 : printf("\nUsing code POSTBAR.D07");break;
              case DCI_D12 : printf("\nUsing code POSTBAR.D12");break;
              case DCI_D22 : printf("\nUsing code POSTBAR.D22");
             }
    printf("  DCI = %c",(char)pcode[0]);
    return;
    }

/* ===================================================== */
/* The main Encoder Routine */
/* ===================================================== */ void encode_to_bars(void)
{int i,j,k,zeta; /* loop variables */
 int n,N;/* code length in symbols and bars */
 int mess[21]; /* the 21 message or information symbols */
 int gen[26]; /* the generator polynomial */
 int deg_gen; /* holds the degree of the generator polynomial */
 int codeword[26]; /* codeword produced by the encoder */ switch (pcode[0])
         {case DCI_D07: {n=10;break;}
          case DCI_D12: {n=15;break;}
          case DCI_D22:  n=25;}

N = 3*n + 4; /* total number of bars in the code used */
/* ===================================================== */
/* Data Converter */
/* The DCI, postal code and data fields (if any) */
/* are converted to a series of n-m field elements */
/* placed in mess[0] .. mess[n-m-1] ready for the encoder. */

/* DCI is put in mess[n-m-1] */
mess[n-m-1] = Ztable[zshift((int) pcode[0])];

/* Repack the Postal Code */
mess[n-m-2] = Atable[shift((int) pcode[1])];
mess[n-m-3] = (Ntable[shift((int) pcode[2])]<<2)^(Atable[shift((int) pcode[3])])>
mess[n-m-4] = ((Atable[shift((int) pcode[3])]&15)<<2)^(Ntable[shift((int) pcode[
mess[n-m-5] = ((Ntable[shift((int) pcode[4])]&3)<<4)^(Atable[shift((int) pcode[5
mess[n-m-6] = ((Atable[shift((int) pcode[5])]&3)<<4)^Ntable[shift((int) pcode[6]

for(j=n-m-7;j>=0;j--) mess[j] = Ztable[zshift((int)pcode[n-m-j])];

/* ===================================================== */
/* Error Correction Encoder */
/* The message is in the form of n-m field elements mess[0] ... mess[n-m-1]. */
/* These go into codeword[m]...codeword[n-1], while the check */
/* symbols go into codeword[0]...codeword[m-1]. */ for(i=0;i<m;i++) codeword[i] = 0;
for(i=m;i<n;i++) codeword[i] = mess[i-m];

/* The generator polynomial is defined. */
deg_gen = 0;gen[0]=1;
```

-35-

```c
        for (j = 0;j<m;j++)
                {deg_gen++; gen[deg_gen] = 1;
                for(i=deg_gen-1;i >0;i--) gen[i] = prod[gen[i]][alpha[j]]^gen[i-1];
                gen[0] = prod[gen[0]][alpha[j]];
                } for(zeta = n-m-1; zeta >=0; zeta--)
            {
            for(k = 0; k <= m ; k++)
                    {
                    codeword[zeta + k] = codeword[zeta + k] ^ (prod[gen[k]][codeword
                    }
            }
    for(i=m;i<n;i++) codeword[i] = mess[i-m];  /* restore the high order symbols */
/* =================================================== */
/* Barcode Maker */
/* =================================================== */
/* This routine takes codeword[0..n-1] and produces the barcode pattern. */
/* The pattern is placed in bars[] as numbers from {0,1,2,3} */
/* The array display[] converts from 0,1,2,3 to B,U,D,T */
/* The start and stop bars are put in place. */
bars[0] = bars[N-2] = 1;
bars[1] = bars[N-1] = 3;

/* The codeword[] is made into bars starting with codeword[n-1] */
/* and working down. */
/* This puts the checks at the right hand end of the barcode. */ for(j=2,k=n-1; k>=0;j+=3,k--)
        {bars[j] = codeword[k] >> 4;
        bars[j+1] = (codeword[k]>>2)&3;
        bars[j+2] = codeword[k]&3;
        }
return;
}

/* =================================================== */
/* Print the Barcode */
/* =================================================== */
/* This routine prints out the bar pattern using vertical rules */ void print_bars(int x, int y)
{
int j,ht,yy;
int N;  /* code length in bars */ switch(pcode[0])
        {case DCI_D07 :(N=34;break;)
         case DCI_D12 : (N=49;break;)
         case DCI_D22 : (N=79;)} if (verbose || output_bars) {
  for (j = 0; j < N; j++) printf("%d",bars[j]);printf("\n");
  return;
} for (j=0; j<N; j++) {
        if (bars[j] == 0) {
                ht = hsize;
```

```
                yy = y - asize - tsize;
        } else if (bars[j] == 1) {
                ht = asize + tsize;
                yy = y - asize - tsize;
        } else if (bars[j] == 2) {
                ht = tsize + dsize;
                yy = y - tsize;
        } else if (bars[j] == 3) {
                ht = tsize;
                yy = y - tsize;
        }
        fprintf(stdprn,"%c*p%dx%dY",27,x,yy);
        fprintf(stdprn,"%c*c%da%db0P",27,xsize,ht);
        x = x + xstep;
   }
 }
/* ================================================== */
/* Print the text information                         */
/* ================================================== */
/* This routine prints the name and address information */ void print_text(int x, int y, int zz)
{
int i;
char buf[40];

y = y + dsize + zz + 30;

strncpy(buf,customer_name,25);
i = 24;
while (i && buf[i] == ' ') --i;
buf[++i] = '\0';

if (verbose) printf("%s\n",buf);
else {
   fprintf(stdprn,"%c*p%dx%dY",27,x,y);
   fprintf(stdprn,"%s",buf);
} y = y + 60;

strncpy(buf,inward_address,35);
i = 34;
while (i && buf[i] == ' ') --i;
buf[++i] = '\0';

if (verbose) printf("%s\n",buf);
else {
   fprintf(stdprn,"%c*p%dx%dY",27,x,y);
   fprintf(stdprn,"%s",buf);
} y = y + 60;

i = 29;
while (i && outward_address[i] == ' ') --i;

strncpy(buf,outward_address,i+1);
buf[++i] = ' ';
buf[++i] = ' ';
```

```
strncpy(&buf[++i],postal_code,3);
i = i + 3;
buf[i++] = ' ';
strncpy(&buf[i],&postal_code[3],3);
i = i + 3;
buf[i] = '\0';

if (verbose) printf("%s\n",buf);
else {
   fprintf(stdprn,"%c*p%dx%dY",27,x,y);
   fprintf(stdprn,"%s",buf);
}
}
```

Program Listing - 94-10-12
Decoder for Postbar.C10

```c
#include <stdio.h>
include <math.h>

/*Constants */
const int n = 16, m = 10; /*code length and number of check symbols */
const int N = 56; /* code length on bars */
const int erase_max = 10; /* max. number of erasure corrections allowed */
const int bad_char = 35;/* code for bad output characters (print as "#") */
/*Global Variables */

/*Static Variables: defined by setup(); used by decode_the_bars() */
int prod[64] [64], inv[64], alog[64]; /*mult., inv. and anti-log. tables */
int Atable[26]; /* the 6 bit (field representation) of letters using A table */
int Aletter[64]; /* the inverse of the table Atable[] */
int Ntable[10]; /* the 4 bit representations of the digits using N table */
int Ndigit[16]; /* the inverse of Ntable[] */
int Ztable[37]; /* The 6 bit representations of alphanumerics using Z table */
int Zchar[64]; /* inverse of the Ztable[] */
int alpha[10]; /* defining roots for the code */

/*Dynamic Variables: input to decode_the_bars() */
int bars[56]; /* holds the bar code pattern in numbers */
/*Dynamic Variables: output from decode_the_bars */
int DCI; /* holds the DCI in ascii after decoding */
int mach_id[4]; /* holds the Machine ID as 0,1,2,3 after decoding */
int decode_flag; /* flag indicating the result of the decoding */
int post_code[6]; /* ascii for the 6 chars. of the postal code after decoding */

/* Function Prototypes */
void setup(void); /* builds the tables; */
void get_decoder_input(char *); /* makes test input for decode_the_bars */
void decode_the_bars(void); /* decodes the bars into postal data */
void print_data(void); /* prints the output data */ int by_alpha(int u); /* utility that multiplies u by alpha in the finite field *
int shift(int u); /* utility that shifts ascii values for use in Atable, Ntable
int zshift(int u); /* utility that shifts ascii values for use in Ztable */ int main(argc,argv)

int argc;
char *argv[];

{
FILE *fd;
char *cp;
char buf[1024];
int i,nline;

if (argc < 2) {
```

```
      printf("Decoder program for code C10 (batch version).\n\n");
      printf("Usage: bpdecc10 filename\n\n");
      printf("   filename contains barcodes to be decoded.\n");
      exit();
   } cp = argv[1];

fd = fopen(cp,"r");
   if (!fd) {
      printf("Unable to open file %s.\n",cp);
      exit();
   } setup();

nline = 0;
   while (fgets(buf,sizeof(buf),fd)) {
      ++nline;
      if (buf[strlen(buf)-1] == '\n') buf[strlen(buf)-1] = '\0';
      for (i=0; i<strlen(buf); i++) {
         if (buf[i] < '0' || buf[i] > '4') {
            fprintf(stderr,"ERROR - Invalid input at line %d.\n",nline);
            fprintf(stderr,"        Invalid character at position %d.\n",i);
            exit();
         }
      }
      get_decoder_input(buf);
      decode_the_bars();
      print_data();
   }
}

/*================================================================ */
/*                     Initialization Routines */
/*================================================================ */ int by_alpha(int u)
{
u = (u << 1);
if (u > 63) u =u^67;
return(u);
} int shift(int u) /* changes ascii to indices for A and N tables */
{ if(u>64) u-=65;
else u -= 48;
return(u);
} int zshift(int u) /* changes ascii to indices for Z table */
{ if(u>64) u-=65;
else if (u==32) u=36;
else u -= 22;
return(u);
}
void setup(void) /* The look-up tables are created */
{
int w0, w1;
```

```
int i, j, k, u, v;

/* Initialize the look-up symbology tables  */
/* The tables Atable[], Ntable[], Ztable[] convert a shifted ascii */
/* argument to the representations for the A,N and Z fields respectively. */
/* Shfted ascii means (ascii -65) for A .. Z and (ascii - 48) for 0..9 */

Atable[0] = 2; Atable[1] = 4; Atable[2] = 5; Atable[3] = 6;
Atable[4] = 8; Atable[5] = 9; Atable[6] = 10; Atable[7] = 1;
Atable[8] = 17; Atable[9] = 18; Atable[10] = 20; Atable[11] = 21;
Atable[12] = 0; Atable[13] = 24; Atable[14] = 25; Atable[15] = 26;
Atable[16] = 32; Atable[17] = 33; Atable[18] = 34; Atable[19] = 36;
Atable[20] = 37; Atable[21] = 38; Atable[22] = 40; Atable[23] = 41;
Atable[24] = 42; Atable[25] = 16;

for(k=0; k<64; k++) Aletter[k] = bad_char; /* unsuitable characters print as # *
for(k=0; k<26; k++) Aletter[Atable[k]] = k+65;

Ntable[0] = 0; Ntable[1] = 1; Ntable[2] = 2; Ntable[3] = 4; Ntable[4] = 5;
Ntable[5] = 6; Ntable[6] = 8; Ntable[7] = 9; Ntable[8] = 10; Ntable[9] = 12;

for(k=0; k<16; k++) Ndigit[k] = bad_char; /* unsuitable characters print as # */
for(k=0; k<10;k++) Ndigit[Ntable[k]] = k+48;

Ztable[0] = 0; Ztable[1] = 1; Ztable[2] = 2; Ztable[3] = 4; Ztable[4] = 5;
Ztable[5] = 6; Ztable[6] = 8; Ztable[7] = 9; Ztable[8] = 10; Ztable[9] = 16;
Ztable[10] = 17;Ztable[11] = 18;Ztable[12] = 20;Ztable[13] = 21;Ztable[14] = 22;
Ztable[15] = 24;Ztable[16] = 25;Ztable[17] = 26;Ztable[18] = 32;Ztable[19] = 33;
Ztable[20] = 34;Ztable[21] = 36;Ztable[22] = 37;Ztable[23] = 38;Ztable[24] = 40;
Ztable[25] = 41;Ztable[26] = 42;Ztable[27] = 48;Ztable[28] = 49;Ztable[29] = 50;
Ztable[30] = 52;Ztable[31] = 53;Ztable[32] = 54;Ztable[33] = 56;Ztable[34] = 57;
Ztable[35] = 58;Ztable[36] = 3;

for(k=0; k < 64; k++) Zchar[k] = bad_char; /* unsuitable characters print as # *
for(k=0; k<26; k++) Zchar[Ztable[k]] = k + 65;  /* ascii for the letters */
for(k=26; k<36; k++) Zchar[Ztable[k]] = k + 22;  /* ascii for the digits */
Zchar[3] = 32; /* ascii for a space */

/* the prod[][] and inv[] tables are defined */
for(k = 0; k < 64;k++) {prod[0][k] = 0; prod[1][k] = k;} w0 = 1; alog[0] = 1;
for(u=1;u<64;u++)
        {w1 = by_alpha(w0);
        alog[u] = w1;
        for(v=0;v<64;v++)
                {
                prod[w1][v] = by_alpha(prod[w0][v]);
                if (prod[w1][v] == 1) inv[w1] = v;
                }
        w0 = w1;}

/* These are the codes for the roots of the generator poly. */
/* They are alpha^1, ... , alpha^10. */
for (k=0;k<m;k++) alpha[k] = alog[k+1];

return;
}
/*================================================ */
/*              Gets Input for Decoder             */
```

```c
/*======================================================== */
void get_decoder_input(char *buf)
{
int i;

for (i=0; i<strlen(buf); i++) bars[i] = buf[i] - '0';
return;
}

/*======================================================== */
/*                    Decode the Bars */
/*======================================================== */
/* The bar pattern is received in bars[] with 0,1,2,3 denoting */
/* H,A,D,T and 4 denoting an erased bar. */ void decode_the_bars(void)
{
int rec[64]; /*received vector (over GF(64)) accepted by decoder */
int cor[64]; /* corrected vector (over GF(64)) produced by decoder */
int a[11], b[11], u[11], v[11]; /*the polynomials in the recursive sequences */
int deg_a, deg_b, deg_v; /*the degrees of these polynomials */
int syn[10]; /*syndrome vector */
int dv[11]; /* the derivative of polynomial v */
int delta, zeta, tau, r, s, t, w, temp; /*temporary scratchpad variables */
int i, j, k; /* loop counters */
int errcount, alpha_i; /*counts the errors, holds alpha^i during correction */
int erase_num; /* counts the number of erased symbols received */
int eraseloc[10]; /* holds locations (0...n) of the erasures */
int bound; /* bound for iterations of Euclidean Algorithm */
int bad_char_check;/* checks for bad characters after decoding */

/* Unpack the bars into a received vector rec[] */
for(j=2,k=15; k>=0;j+=3,k--)
        {if ((bars[j] == 4) || (bars[j+1]==4) || (bars[j+2]==4)) rec[k] = 64;
          else rec[k] = (bars[j]<<4) ^ (bars[j+1]<<2) ^ bars[j+2];}

/*======================================================== */
/*                The Error Correction Routine */
/* */
/*  =======  Initialize, Catalogue the Erasures  ========= */
/*             and Calulate the Syndrome */ erase_num = 0;
decode_flag = 1;

for(j=0; j<n; j++)      /* Count the erasures and set the erased symbols to 0. *
        if (rec[j] >= 64)  /* Erased symbols come in coded as 64. */
                {eraseloc[erase_num] = j;
                erase_num++;
                rec[j] = 0;
                }
for(i=0; i<n; i++) cor[i] = rec[i]; /*copy the received rec[] into corrected cor if(erase_num > erase_max)       /* Check for too many erasures */
        { decode_flag = 2;
        post_code[0] = Aletter[cor[14]];
        post_code[1] = Ndigit[cor[13]>>2];
        post_code[2] = Aletter[((cor[13]&3)<<4)^(cor[12]>>2)];
        post_code[3] = Ndigit[((cor[12]&3)<<2)^(cor[11]>>4)];
        post_code[4] = Aletter[((cor[11]&15)<<2)^(cor[10]>>4)];
```

```c
            post_code[5] = Ndigit[cor[10]&15];
            DCI = Zchar[cor[15]];
            for(i=0;i<4;i++) mach_id[i] = bars[i+50];
            return;}
    temp = 0;
    for(k=0;k<m;k++)                    /* Calculate the syndrome */
        {
        w = alpha[k]; s = rec[n-1];
        for (j = n-2;j >=0;j--) s = rec[j] ^ prod[s][w];
        syn[k] = s;
        temp = temp || s;   /* temp is checking for a non-zero syndrome */
        }
    if (temp == 0)      /* if the syndrome is 0 exit */
            { decode_flag = 0;
            post_code[0] = Aletter[cor[14]];
            post_code[1] = Ndigit[cor[13]>>2];
            post_code[2] = Aletter[((cor[13]&3)<<4)^(cor[12]>>2)];
            post_code[3] = Ndigit[((cor[12]&3)<<2)^(cor[11]>>4)];
            post_code[4] = Aletter[((cor[11]&15)<<2)^(cor[10]>>4)];
            post_code[5] = Ndigit[cor[10]&15];
            DCI = Zchar[cor[15]];
            for(i=0;i<4;i++) mach_id[i] = bars[i+50];
            return;}

/* ======== Setup for Euclidean Algorithm ========== */ for(k = 0;k<=m;k++)    /* initial values for poly. in Euclidean Alg. */
            { a[k] = u[k] = v[k] = 0;
              b[k] = syn[k];
            }
    a[m] = 1; v[0] = 1; deg_a = m; deg_v = 0;

if(erase_num > 0)       /* initialization for erasures */
            { for(k = 0 ; k < erase_num ; k++)
                { deg_v++;
                  w = alog[eraseloc[k]];
                  for(j=deg_v ; j>0 ; j--) v[j] = v[j] ^ prod[w][v[j-1]];
                }
            for(k=0; k<m; k++)
                    for (i=1; i<=k; i++)
                            b[k] = b[k] ^ prod[v[i]][syn[k-i]];
            }
    for(deg_b=m-1; (b[deg_b]==0)&&(deg_b>0); deg_b--);   /* Calc. degree of b[] */
    bound = (m/2) + (erase_num >>1);     /*Calc. the bound for iterations below */

/* ======= Euclidean Algorithm ======== */ while (deg_b >= bound)
            {
            delta = deg_a - deg_b;
            w = inv[b[deg_b]];
            for(zeta=0; zeta <=delta; zeta++)
                    {
                    tau = prod[a[deg_a - zeta]][w];
                    for(k=0; k <= deg_b; k++)
                            {
                            a[delta - zeta + k] ^= (prod[b[k]][tau]);
                            u[delta - zeta + k] ^= (prod[v[k]][tau]);
                            }
```

-43-

```
                }
        for(k = 0; k <=deg_a; k++)
                {temp = a[k]; a[k] = b[k]; b[k] = temp;}
        for(k = 0; k <= m; k++)
                {temp = u[k]; u[k] = v[k]; v[k] = temp;}
        deg_a = deg_b;
        for(deg_b = deg_b - 1; (b[deg_b] == 0)&&(deg_b>0); deg_b--);
   deg_v += delta;
        }

/* b[] is now the error evaluator; v[] is the error locator */

/*========== Make the Corrections ========== */ for(i=0; i < deg_v; i +=2)   /* Calc. the derivative of the error locator */
        {dv[i] = v[i+1]; dv[i+1] = 0;} errcount = 0; /*errcount will record the number of errors found */
alpha_i = 1;
for(i=0;i<n;i++)
        { w = inv[alpha_i];
        s=v[deg_v]; for(k=deg_v-1; k >=0; k--) s = prod[s][w]^v[k];
        if (s == 0)
                { errcount++;
        r=dv[deg_v-1]; for(k=deg_v-2; k >=0; k--) r = prod[r][w]^dv[k];
                t=b[deg_b]; for(k=deg_b-1; k>=0; k--) t = prod[t][w]^b[k];
                cor[i] = cor[i] ^ prod[t][inv[r]];
                }
        alpha_i = by_alpha(alpha_i);
        } if ( errcount < deg_v)
        { decode_flag = 3;
        for(j=0; j<n; j++) cor[j] = rec[j];} post_code[0] = Aletter[cor[14]];
post_code[1] = Ndigit[cor[13]>>2];
post_code[2] = Aletter[((cor[13]&3)<<4)^(cor[12]>>2)];
post_code[3] = Ndigit[((cor[12]&3)<<2)^(cor[11]>>4)];
post_code[4] = Aletter[((cor[11]&15)<<2)^(cor[10]>>4)];
post_code[5] = Ndigit[cor[10]&15];
DCI = Zchar[cor[15]];
for(i=0;i<4;i++) mach_id[i] = bars[i+50];
/* and finally, check for any unacceptable characters */
bad_char_check = (DCI == bad_char);
for(i=0;i<6;i++) bad_char_check |= (post_code[i] == bad_char);
if (bad_char_check ==1) decode_flag = 4;
return;
}
/*====================================================== */
/*                  Print the decoded data */
/* ====================================================== */
void print_data(void)
{
int j; /* loop counter and temporary variable */
char display[5]; /* table converting 0,1,2,3,4 to B,U,D,T,e. */ display[0] = (char) 72; display[1] = (char) 65;
display[2] = (char) 68; display[3] = (char) 84;
display[4] = (char) 101; /* erasurers print as 'e' */
```

-44-

```
switch(decode_flag)
        {case 0: break;
        case 1: break;
        case 2: printf("Failed - too many erasures.\n"); break;
        case 3: printf("Failed - too many errors.\n"); break;
        case 4: printf("Decoding failure.\n"); break;
        default: {printf("Unknown decode flag value received.\n");}
        } printf("DCI: %c",DCI);
printf("  Postal code:  ");
for(j=0; j<3;j++) printf("%c",(char) post_code[j]);
printf(" ");
for(j=3; j<6;j++) printf("%c",(char) post_code[j]);

printf("  Machine ID: "); for(j=0; j<4;j++) printf("%c",(char) display[mach_id[j
printf("\n");
return;
}
```

Program Listing - 94-10-12
Decoder for Postbar.D07, Postbar.D12 and Postbar.D22.

```c
#include <stdio.h>
include <math.h>

/*Constants */
const int m = 4; /* number of check symbols */
const int erase_max = 4; /* max. number of erasure corrections allowed */
const int bad_char = 35; /* code for bad characters (print as "#") */

/*Global Variables */

/*Static Variables: defined by setup(); used by decode_the_bars() */
int prod[64] [64], inv[64], alog[64]; /*mult., inv. and anti-log. tables */
int Atable[26];  /* the 6 bit (field representation) of letters using A table */
int Aletter[64]; /* the inverse of the table Atable[] */
int Ntable[10];  /* the 4 bit representations of the digits using N table */
int Ndigit[16];  /* the inverse of Ntable[] */
int Ztable[37]; /* The 6 bit representations of alphanumerics using Z table */
int Zchar[64]; /* inverse of the Ztable[] */
int alpha[4]; /* defining roots for the error correcting code */

/*Dynamic Variables: input to decode_the_bars() */
int bars[79]; /* holds the bar code pattern in numbers */
int code_id; /* holds code id. used by the decoder */
            /* (from DCI or number of bars) */
            /* code_id = 0 for D07, = 1 for D12, = 2 for D22 */

/*Dynamic Variables: output from decode_the_bars */
int DCI; /* holds the DCI in ascii after decoding */
int data_field[20];/* holds the AL and Cust. fields in ascii after decoding */
int decode_flag; /* flag indicating the result of the decoding */
int post_code[6]; /* ascii for the 6 chars. of the postal code after decoding */

/* Function Prototypes */

/* principal routines */
void setup(void); /* builds the tables; */
void get_decoder_input(char *); /* gets input for decode_the_bars */
void decode_the_bars(void); /* decodes the bars into postal data */
void print_data(void); /* prints the output data */

/* utilities used by setup() */
int by_alpha(int u); /* utility that multiplies u by alpha in the finite field *
int shift(int u); /* utility that shifts ascii values for use in Atable, Ntable
int zshift(int u); /* utility that shifts ascii values for use in Ztable */

/*Main Program */ int main(argc,argv)

int argc;
```

```
  char.*argv[];

{
FILE *fd;
char *cp;
char buf[1024];
int i,nline;

if (argc < 2) {
   printf("Decoder program for the D codes (batch version).\n\n");
   printf("Usage: bpdecd filename\n\n");
   printf("   filename contains barcodes to be decoded.\n");
   exit();
} cp = argv[1];

fd = fopen(cp,"r");
if (!fd) {
   printf("Unable to open file %s.\n",cp);
   exit();
} setup();

nline = 0;
while (fgets(buf,sizeof(buf),fd)) {
   ++nline;
   if (buf[strlen(buf)-1] == '\n') buf[strlen(buf)-1] = '\0';
   for (i=0; i<strlen(buf); i++) {
      if (buf[i] < '0' || buf[i] > '4') {
         fprintf(stderr,"ERROR - Invalid input at line %d.\n",nline);
         fprintf(stderr,"        Invalid character at position %d.\n",i);
         exit();
      }
   }
   get_decoder_input(buf);
   decode_the_bars();
   print_data();
}
}

/*================================================== */
/*                Initialization Routines */
/*================================================== */ int by_alpha(int u)
{
u = (u << 1);
if (u > 63) u =u^67;
return(u);
} int shift(int u) /* changes ascii to indices for A and N tables */
{ if(u>64) u-=65;
else u -= 48;
return(u);
}
```

```
int zshift(int u) /* changes ascii to indices for Z table */
{ if(u>64) u-=65;
else if (u==32) u=36;
else u -= 22;
return(u);
} void setup(void) /* The look-up tables are created */
{
int w0, w1;
int i, j, k, u, v;

/* Initialize the look-up symbology tables  */
/* The tables Atable[], Ntable[], Ztable[] convert a shifted ascii */
/* argument to the representations for the A,N and Z fields respectively. */
/* Shfted ascii means (ascii -65) for A .. Z and (ascii - 48) for 0..9 */

Atable[0] = 2; Atable[1] = 4; Atable[2] = 5; Atable[3] = 6;
Atable[4] = 8; Atable[5] = 9; Atable[6] = 10; Atable[7] = 1;
Atable[8] = 17; Atable[9] = 18; Atable[10] = 20; Atable[11] = 21;
Atable[12] = 0; Atable[13] = 24; Atable[14] = 25; Atable[15] = 26;
Atable[16] = 32; Atable[17] = 33; Atable[18] = 34; Atable[19] = 36;
Atable[20] = 37; Atable[21] = 38; Atable[22] = 40; Atable[23] = 41;
Atable[24] = 42; Atable[25] = 16;

for(k=0; k<64; k++) Aletter[k] = bad_char; /* unsuitable characters print as # *
for(k=0; k<26; k++) Aletter[Atable[k]] = k+65;

Ntable[0] = 0; Ntable[1] = 1; Ntable[2] = 2; Ntable[3] = 4; Ntable[4] = 5;
Ntable[5] = 6; Ntable[6] = 8; Ntable[7] = 9; Ntable[8] = 10; Ntable[9] = 12;

for(k=0; k<16; k++) Ndigit[k] = bad_char; /* unsuitable characters print as # */
for(k=0; k<10;k++) Ndigit[Ntable[k]] = k+48;

Ztable[0] = 0; Ztable[1] = 1; Ztable[2] = 2; Ztable[3] = 4; Ztable[4] = 5;
Ztable[5] = 6; Ztable[6] = 8; Ztable[7] = 9; Ztable[8] = 10; Ztable[9] = 16;
Ztable[10] = 17;Ztable[11] = 18;Ztable[12] = 20;Ztable[13] = 21;Ztable[14] = 22;
Ztable[15] = 24;Ztable[16] = 25;Ztable[17] = 26;Ztable[18] = 32;Ztable[19] = 33;
Ztable[20] = 34;Ztable[21] = 36;Ztable[22] = 37;Ztable[23] = 38;Ztable[24] = 40;
Ztable[25] = 41;Ztable[26] = 42;Ztable[27] = 48;Ztable[28] = 49;Ztable[29] = 50;
Ztable[30] = 52;Ztable[31] = 53;Ztable[32] = 54;Ztable[33] = 56;Ztable[34] = 57;
Ztable[35] = 58;Ztable[36] = 3;

for(k=0; k < 64; k++) Zchar[k] = bad_char; /* unsuitable characters print as # *
for(k=0; k<26; k++) Zchar[Ztable[k]] = k + 65;   /* ascii for the letters */
for(k=26; k<36; k++) Zchar[Ztable[k]] = k + 22; /* ascii for the digits */
Zchar[3] = 32; /* ascii for a space */

/* the prod[][] and inv[] tables are defined */
for(k = 0; k < 64;k++) (prod[0][k] = 0; prod[1][k] = k;)

w0 = 1; alog[0] = 1;
for(u=1;u<64;u++)
        {w1 = by_alpha(w0);
        alog[u] = w1;
        for(v=0;v<64;v++)
                {
                prod[w1][v] = by_alpha(prod[w0][v]);
                if (prod[w1][v] == 1) inv[w1] = v;
                }
```

```
        w0 = w1;)

/* These are the codes for the roots of the generator poly. */
/* They are alpha^1, ... , alpha^10. */
for (k=0;k<m;k++) alpha[k] = alog[k+1];

return;
}
/*================================================== */
/*              Makes Test Input for Decoder */
/*================================================== */
void get_decoder_input(char *buf)
{
int i;

for (i=0; i<strlen(buf); i++) bars[i] = buf[i] - '0';
if (strlen(buf) > 49)
   code_id = 2;
else if (strlen(buf) > 34)
   code_id = 1;
else
   code_id = 0;

return;
}
/*================================================== */
/*              Decode the Bars   */
/*================================================== */
/* The main decoding routine. */
/* The bar pattern is received in bars[] with 0,1,2,3 denoting */
/* H,A,D,T and 4 denoting an erased bar. */
/* The barcode used is identified by code_id = 0 for D07, */
/*         = 1 for D12, = 2 for D22. */ void decode_the_bars(void)
{
int i,j,k; /* loop counters */
int n,N; /* code length in characters(n) and in bars(N) */
int a[5], b[5], u[5], v[5]; /*the polys in the recursive sequences */
int rec[26]; /*received vector accepted by decoder */
int cor[26]; /* corrected vector produced by decoder */
int deg_a, deg_b, deg_v; /*the degrees of these polynomials */
int syn[4]; /*syndrome vector */
int dv[5]; /* the derivative of polynomial v */
int delta, zeta, tau, r, s, t, w, temp; /*temporary scratchpad variables */
int errcount, alpha_i; /*counts the errors, holds alpha^i during correction */
int erase_num; /* counts the number of erased symbols received */
int eraseloc[5]; /* holds locations (0...n) of the erasures */
int bound; /* bound for iterations of Euclidean Algorithm */
int bad_char_check;/* flag for bad characters after decoding */

/*calculate code length in symbols(n) and bars(N) */
switch(code_id)
        {case 0: {n=10;break;}
         case 1: {n=15;break;}
         case 2: n=25;}

/* Unpack the bars into a received vector rec[] */
for(j=2,k=n-1;k>=0;j+=3,k--)
        if((bars[j]==4)||(bars[j+1]==4)||(bars[j+2]==4)) rec[k]=64;
```

```
                else rec[k] = (bars[j]<<4)^(bars[j+1]<<2)^bars[j+2];
/* ======= Initialize, Catalogue the Erasures ======== */
/*                and Calulate the Syndrome */
erase_num = 0;
decode_flag = 1;

for(j=0; j<n; j++)     /* Count the erasures and set the erased symbols to 0. *
        if (rec[j] >= 64)  /* Erased symbols come in coded as 64. */
                {eraseloc[erase_num] = j;
                erase_num++;
                rec[j] = 0;
                }
for(i=0; i<n; i++) cor[i] = rec[i]; /*copy the received rec[] into corrected cor if(erase_num > erase_max)     /* Check for too many erasures */
        { decode_flag = 2; return;}
temp = 0;
for(k=0;k<m;k++)                     /* Calculate the syndrome */
        {
        w = alpha[k]; s = rec[n-1];
        for (j = n-2;j >=0;j--) s = rec[j] ^ prod[s][w];
        syn[k] = s;
        temp = temp || s;  /* temp is checking for a non-zero syndrome */
        }
if (temp == 0)    /* if the syndrome is 0 exit */
        { decode_flag = 0;
        DCI = Zchar[cor[n-1]];
        if (code_id == 2) for(i=0;i<15;i++) data_field[i] = Zchar[cor[n-7-i]];
        if (code_id == 1) for(i=0;i<5;i++) data_field[i] = Zchar[cor[n-7-i]];
        post_code[0] = Aletter[cor[n-2]];
        post_code[1] = Ndigit[cor[n-3]>>2];
        post_code[2] = Aletter[((cor[n-3]&3)<<4)^(cor[n-4]>>2)];
        post_code[3] = Ndigit[((cor[n-4]&3)<<2)^(cor[n-5]>>4)];
        post_code[4] = Aletter[((cor[n-5]&15)<<2)^(cor[n-6]>>4)];
        post_code[5] = Ndigit[cor[n-6]&15];
        return;}

/* ======= Setup for Euclidean Algorithm ========= */ for(k = 0;k<=m;k++)    /* initial values for poly. in Euclidean Alg. */
        { a[k] = u[k] = v[k] = 0;
        b[k] = syn[k];
        }
a[m] = 1; v[0] = 1; deg_a = m; deg_v = 0;

if(erase_num > 0)       /* initialization for erasures */
        { for(k = 0 ; k < erase_num ; k++)
                { deg_v++;
                w = alog[eraseloc[k]];
                for(j=deg_v ; j>0  ; j--) v[j] = v[j] ^ prod[w][v[j-1]];
                }
        for(k=0; k<m; k++)
                for (i=1; i<=k; i++)
                        b[k] = b[k] ^ prod[v[i]][syn[k-i]];
        }
for(deg_b=m-1; (b[deg_b]==0)&&(deg_b>0); deg_b--);   /* Calc. degree of b[] */
bound = (m/2) + (erase_num >>1);     /*Calc. the bound for iterations below */
```

```
/* ========= Euclidean Algorithm ========= */
while (deg_b >= bound)
        {
        delta = deg_a - deg_b;
        w = inv[b[deg_b]];
        for(zeta=0; zeta <=delta; zeta++)
                {
                tau = prod[a[deg_a - zeta]][w];
                for(k=0; k <= deg_b; k++)
                        {
                        a[delta - zeta + k] ^= (prod[b[k]][tau]);
                        u[delta - zeta + k] ^= (prod[v[k]][tau]);
                        }
                }
        for(k = 0; k <=deg_a; k++)
                (temp = a[k]; a[k] = b[k]; b[k] = temp;}
        for(k = 0; k <= m; k++)
                (temp = u[k]; u[k] = v[k]; v[k] = temp;}
        deg_a = deg_b;
        for(deg_b = deg_b - 1; (b[deg_b] == 0)&&(deg_b>0); deg_b--);
    deg_v += delta;
        }

/* b[] is now the error evaluator; v[] is the error locator */

/*=========== Make the Corrections =========== */ for(i=0; i < deg_v; i +=2)   /* Calc. the derivative of the error locator */
        {dv[i] = v[i+1]; dv[i+1] = 0;} errcount = 0; /*errcount will record the number of errors found */
alpha_i = 1;
for(i=0;i<n;i++)
        { w = inv[alpha_i];
        s=v[deg_v]; for(k=deg_v-1; k >=0; k--) s = prod[s][w]^v[k];
        if (s == 0)
                { errcount++;
        r=dv[deg_v-1]; for(k=deg_v-2; k >=0; k--) r = prod[r][w]^dv[k];
                t=b[deg_b]; for(k=deg_b-1; k>=0; k--) t = prod[t][w]^b[k];
                cor[i] = cor[i] ^ prod[t][inv[r]];
                }
        alpha_i = by_alpha(alpha_i);
        } if ( errcount < deg_v)
        { decode_flag = 3;
        for(j=0; j<n; j++) cor[j] = rec[j];}

/*define the output */

DCI = Zchar[cor[n-1]];
if (code_id == 2) for(i=0;i<15;i++) data_field[i] = Zchar[cor[n-7-i]];
if (code_id == 1) for(i=0;i<5;i++) data_field[i] = Zchar[cor[n-7-i]];
post_code[0] = Aletter[cor[n-2]];
post_code[1] = Ndigit[cor[n-3]>>2];
post_code[2] = Aletter[((cor[n-3]&3)<<4)^(cor[n-4]>>2)];
post_code[3] = Ndigit[((cor[n-4]&3)<<2)^(cor[n-5]>>4)];
post_code[4] = Aletter[((cor[n-5]&15)<<2)^(cor[n-6]>>4)];
post_code[5] = Ndigit[cor[n-6]&15];
```

```
/* and finally, check for any unacceptable characters */
bad_char_check = 0;
for(i=0;i<6;i++) bad_char_check |= (post_code[i] == bad_char);
if (code_id == 2) for(i=0;i<15;i++) bad_char_check |= (data_field[i] == bad_char)
if (code_id == 1) for(i=0;i<5;i++) bad_char_check |= (data_field[i] == bad_char)
if (bad_char_check ==1) decode_flag = 4;
return;
}

/*===========================================================*/
/*                    Print the decoded data */
/*===========================================================*/
void print_data(void)
{
int j; /* loop counter and temporary variable */ switch(decode_flag)
        {case 0: break;
        case 1: break;
        case 2: printf("Failed - too many erasures.\n"); break;
        case 3: printf("Failed - too many errors.\n"); break;
        case 4: printf("Decoding failure.\n"); break;
        default: {printf("Unknown decode flag value received.\n");}
        } printf("DCI: %c",DCI);
printf("\tPostal code:   ");
for(j=0; j<3;j++) printf("%c",(char) post_code[j]);
printf(" ");
for(j=3; j<6;j++) printf("%c",(char) post_code[j]);
if (code_id > 0) printf("\tData Field: ");
if (code_id==1) {for(j=0;j<5;j++) printf("%c",(char)data_field[j]);}
if (code_id==2) {for(j=0;j<15;j++) printf("%c",(char)data_field[j]);}
printf("\n");
return;
}
```

We claim:

1. A mail piece bearing a bar codeword containing information for the processing of the mail piece, the bar codeword having a plurality of parallel bars each of which has a state selected from a plurality of possible states, the bar codeword comprising a start field followed by a data content identifier (DCI) field specifying the structure of the codeword followed by at least one data field, followed by a Reed-Solomon parity field, followed by a stop field.

2. A mail piece according to claim 1 in which the start field and the stop field are identical, each consisting of two different state bars.

3. A mail piece according to claim 1 in which the Reed-Solomon field contains a plurality of Reed-Solomon characters each encoded in 3 bars.

4. A mail piece according to claim 1 in which the DCI is encoded in three bars.

5. A mail piece according to claim 1 in which the at least one data field includes at least one of a postal code, with or without address locator, customer information and service information.

6. A mail piece according to claim 5 in which the at least one data field contains characters each of which is encoded in three bars.

7. A mail piece according to claim 5 in which the postal code contains alphabetic characters and numeric characters, the alphabetic characters being encoded in three bars and the numeric characters being encoded in two bars, any remaining data being encoded in three bar characters.

8. A mail piece according to claim 1 in which the at least one data field includes a country code followed by at least one of a postal code, with or without an address locator, customer information and service information.

9. A mail piece according to claim 8 in which the at least one data field contains characters each of which is encoded in three bars.

10. A mail piece according to claim 1 in which the at least one data field includes a postal code and in which a further data field comprising machine ID follows the Reed-Solomon parity field.

11. A mail piece according to claim 10 in which the machine ID is represented by four bars and each bar state has a unique numerical value.

12. A mail piece according to claim 1 in which a bar code sequencer field is located between the DCI field and the at least one data field, the bar code sequencer field containing a code indicating one of the bar code is a single code, the bar code is the first of two concatenated bar codes and the bar code is the second of two concatenated bar codes.

13. A mail piece according to claim 1 in which the codeword may be applied by one of the Post Office and a customer, the Reed-Solomon parity field being longer for a Post Office applied codeword than for a customer applied codeword.

14. A mail piece bearing a bar codeword containing information for the processing of the mail piece, the bar codeword having a plurality of parallel bars each of which has one of four possible states selected from a full height bar (H), extending between an upper and lower level, a partial height bar (D) descending to the lower level, a partial height bar (A) ascending to the upper level, and a bar (T) the height and position of which is determined by overlap of the descending and ascending bars, the bar codeword comprising a start field followed by a data content identifier (DCI) field specifying the structure of the codeword followed by at least one data field followed by a Reed-Solomon parity field followed by a stop field.

15. A mail piece according to claim 14 in which the start field and the stop field are identical, each consisting of two different state bars.

16. A mail piece according to claim 15 in which the start and stop bars are an A bar followed by a T bar.

17. A mail piece according to claim 14 in which the DCI is encoded in three bars.

18. A mail piece according to claim 14 in which the at least one data field includes at least one of a postal code, with or without address locator, customer information and service information.

19. A mail piece according to claim 15 in which the at least one data field contains characters each of which is encoded in three bars.

20. A mail piece according to claim 18 in which the postal code contains alphabetic characters and numeric characters, the alphabetic characters being encoded in three bars and the numeric characters being encoded in two bars, any remaining data being encoded in three bar characters.

21. A mail piece according to claim 14 in which the at least one data field includes a country code followed by at least one of a postal code, with or without an address locator, customer information and service information.

22. A mail piece according to claim 21 in which the at least one data field contains characters each of which is encoded in three bars.

23. A mail piece according to claim 14 in which the at least one data field includes a postal code and in which a further data field comprising machine ID follows the Reed-Solomon parity field.

24. A mail piece according to claim 23 in which the machine ID is represented by four bars and each bar state has a unique numerical value.

25. A mail piece according to claim 14 in which a bar code sequencer field is located between the DCI field and the at least one data field, the bar code sequencer field containing a code indicating one of the bar code is a single code, the bar code is the first of two concatenated bar codes and the bar code is the second of two concatenated bar codes.

26. A mail piece according to claim 14 in which the codeword may be applied by one of the Post Office and a customer, the Reed-Solomon parity field being longer for a Post Office applied codeword than for a customer applied codeword.

27. A mail piece according to claim 14 in which the Reed-Solomon field contain a plurality of Reed-Solomon characters each encoded in 3 bars.

* * * * *